(12) United States Patent
Schoolcraft

(10) Patent No.: US 9,133,924 B2
(45) Date of Patent: Sep. 15, 2015

(54) SPLIT POWER INFINITELY VARIABLE TRANSMISSION ARCHITECTURE

(71) Applicant: Allison Transmission, Inc., Indianapolis, IN (US)

(72) Inventor: Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/212,577

(22) Filed: Mar. 14, 2014

(65) Prior Publication Data

US 2014/0274540 A1    Sep. 18, 2014

Related U.S. Application Data

(60) Provisional application No. 61/798,476, filed on Mar. 15, 2013.

(51) Int. Cl.
*F16H 37/02* (2006.01)
*F16H 37/08* (2006.01)

(52) U.S. Cl.
CPC ...... *F16H 37/086* (2013.01); *F16H 2037/0873* (2013.01); *F16H 2037/0886* (2013.01); *F16H 2200/2012* (2013.01); *F16H 2200/2043* (2013.01); *F16H 2200/2097* (2013.01)

(58) Field of Classification Search
CPC . F16H 37/02; F16H 37/022; F16H 2037/023; F16H 37/0873; F16H 37/0866
USPC .................................. 475/207, 218, 219, 302
See application file for complete search history.

(56) References Cited

U.S. PATENT DOCUMENTS

| 2,347,873 | A | 5/1944 | Bloomfield |
| 2,410,818 | A | 11/1946 | Grant |
| 2,554,221 | A | 5/1951 | Stephenson et al. |
| 2,583,843 | A | 1/1952 | Herrick |
| 2,596,654 | A | 5/1952 | Clark et al. |
| 2,718,292 | A | 9/1955 | Meilander et al. |
| 2,841,330 | A | 7/1958 | Brewer et al. |
| 3,324,744 | A | 6/1967 | Roper |

(Continued)

FOREIGN PATENT DOCUMENTS

| EP | 1519084 A2 | 9/2004 |
| WO | 9849455 A2 | 11/1998 |
| WO | 2010048029 A2 | 4/2010 |

OTHER PUBLICATIONS

U.S. Appl. No. 61/798,476, entitled "Split Power Infinitely Variable Transmission," by Brian Schoolcraft, filed Mar. 15, 2013, 45 pages.

(Continued)

*Primary Examiner* — Huan Le
(74) *Attorney, Agent, or Firm* — Barnes & Thornburg LLP

(57) ABSTRACT

A transmission includes an input shaft, an output shaft, a variator, a plurality of clutches including a first clutch, a second clutch, a third clutch, a fourth clutch, and a variator bypass clutch, and a plurality of gearsets including a first gearset, a second gearset, a third gearset, and a fourth gearset. The transmission is operable in a plurality of operating modes, including at least mode in which the variator is utilized to provide a transmission ratio varying within a defined range and at least one mode in which the variator is bypassed to provide a fixed transmission ratio.

20 Claims, 12 Drawing Sheets

(56) References Cited

U.S. PATENT DOCUMENTS

| | | | |
|---|---|---|---|
| 3,432,016 A | 3/1969 | Vogt | |
| 3,481,436 A | 12/1969 | Wilkowski | |
| 3,631,741 A | 1/1972 | Kelbel | |
| 4,114,478 A | 9/1978 | Clauss | |
| 4,290,320 A | 9/1981 | Abbott | |
| 4,361,217 A | 11/1982 | Bieber et al. | |
| 4,381,828 A | 5/1983 | Lunn et al. | |
| 4,813,524 A | 3/1989 | Reik | |
| 5,152,726 A | 10/1992 | Lederman | |
| 5,355,981 A | 10/1994 | Itoh et al. | |
| 5,407,024 A | 4/1995 | Watson et al. | |
| 5,441,130 A | 8/1995 | Ha | |
| 5,538,121 A | 7/1996 | Hering | |
| 5,584,776 A | 12/1996 | Weilant et al. | |
| 5,653,322 A | 8/1997 | Vasa et al. | |
| 5,662,198 A | 9/1997 | Kojima et al. | |
| 5,704,867 A | 1/1998 | Bowen | |
| 5,771,477 A | 6/1998 | Showalter et al. | |
| 5,833,566 A | 11/1998 | Showalter | |
| 5,884,526 A | 3/1999 | Fogelberg | |
| 5,893,812 A | 4/1999 | Narai et al. | |
| 5,918,715 A | 7/1999 | Ruth et al. | |
| 5,992,592 A | 11/1999 | Showalter | |
| 6,045,477 A * | 4/2000 | Schmidt | 475/207 |
| 6,062,361 A | 5/2000 | Showalter | |
| 6,149,540 A | 11/2000 | Johnson et al. | |
| 6,149,543 A | 11/2000 | Breen | |
| 6,155,395 A | 12/2000 | Braford | |
| 6,251,045 B1 | 6/2001 | Oliveira et al. | |
| 6,460,671 B1 | 10/2002 | Karambelas et al. | |
| 6,588,559 B2 | 7/2003 | Blair | |
| 6,672,442 B2 | 1/2004 | Kato et al. | |
| 6,679,367 B2 | 1/2004 | Baker et al. | |
| 6,790,153 B2 | 9/2004 | Goto | |
| 6,834,750 B2 | 12/2004 | Baker et al. | |
| 6,846,257 B2 | 1/2005 | Baker et al. | |
| 7,052,430 B2 | 5/2006 | Stevenson et al. | |
| 7,189,182 B2 | 3/2007 | Stevenson et al. | |
| 7,204,337 B2 | 4/2007 | Wildfellner | |
| 7,217,216 B2 * | 5/2007 | Inoue | 475/215 |
| 7,219,569 B2 | 5/2007 | Jastrzembowski et al. | |
| 8,152,673 B2 | 4/2012 | Yanay | |
| 8,298,112 B2 | 10/2012 | Takada | |
| 2002/0005325 A1 | 1/2002 | Yamada | |
| 2003/0051959 A1 | 3/2003 | Blair | |
| 2003/0226415 A1 | 12/2003 | Baker et al. | |
| 2004/0104096 A1 | 6/2004 | Genise | |
| 2008/0125269 A1 | 5/2008 | Gumpoltsberger | |

OTHER PUBLICATIONS

U.S. Appl. No. 61/799,200, entitled "Three-Position Dog Clutch," by Brian Schoolcraft, filed Mar. 15, 2013, 31 pages.
U.S. Appl. No. 61/794,523, entitled "Variator Bypass Clutch," by James Raszkowski et al., filed Mar. 15, 2013, 31 pages.
Search Report and Written Opinion from the International Searching Authority for Application No. PCT/US2014/028823, dated Aug. 5, 2014, 9 pages.

* cited by examiner

| REGIME | CLUTCHES APPLIED | | | | | TRANSMISSION RATIO IN MODE | | |
| --- | --- | --- | --- | --- | --- | --- | --- | --- |
| | C1 | C2 | C3 | C4 | C5 | MIN | FIXED | MAX |
| MODE 1 | X | | | | | -0.25 | | 0.21 |
| BYPASS 1 | X | X | | | | | -0.03 | |
| SYNC 1-2 | X | X | X | | | | 0.21 | |
| MODE 2 | MX | X | X | | | 0.21 | | 0.50 |
| BYPASS 2 | X | X | X | | | | 0.36 | |
| SYNC 2-3 | X | X | X | | X | | 0.50 | |
| MODE 3 | | X | X | X | | 0.50 | | 1.00 |
| BYPASS 3 | | | X | X | X | | 0.74 | |
| SYNC 3-4 | | | | X | X | | 1.00 | |
| MODE 4 | | X | | X | X | 1.00 | | 1.80 |
| BYPASS 4 | | X | | | X | | 1.41 | |

FIG. 6

SPLIT POWER INFINITELY VARIABLE TRANSMISSION ARCHITECTURE

CROSS REFERENCE TO RELATED U.S. APPLICATIONS

This application claims priority to and the benefit of U.S. Provisional Patent Application Ser. No. 61/798,476 entitled "SPLIT POWER INFINITELY VARIABLE TRANSMISSION," which was filed on Mar. 15, 2013, the entirety of which is incorporated herein by reference.

TECHNICAL FIELD

The present disclosure relates generally to infinitely variable transmissions, and more particularly, to the architectures of infinitely variable transmissions including ratio-varying units.

BACKGROUND

Continuously variable transmissions (CVTs) utilize a ratio-varying unit ("variator") to provide a continuous variation of transmission ratio rather than a series of predetermined ratios. The variator is coupled between the transmission input and the transmission output via gearing and one or more clutches.

In one type of continuously variable transmission, referred to as an infinitely variable transmission (IVT), a zero output speed can be obtained independently of the rotational input speed provided to the transmission by the drive unit in a geared neutral mode. Infinitely variable transmissions often use a variator and a planetary gear train to split power flow into two parts. For instance, power may flow along a first path through the variator and along a second path through the planetary gear train. Power may also be recirculated to the variator, thereby increasing the load experienced by the variator during the operation of the infinitely variable transmission. Most current architectures for infinitely variable transmissions subject the variator to the entire power load recirculated through the infinitely variable transmission.

SUMMARY

According to one aspect of the present disclosure, a transmission is operable in a plurality of operating modes and includes an input shaft, a plurality of gearsets, a variable-ratio unit, and a plurality of torque-transmitting mechanisms. The input shaft is configured to receive torque from a drive unit and transmit the torque to an output shaft of the transmission. The plurality of gearsets are arranged between the input shaft and the output shaft. The plurality of gearsets includes a first planetary gearset coupled to the input shaft and a second planetary gearset coupled to the input shaft. The variable-ratio unit is coupled to the second planetary gearset and is configured to receive a power load. The plurality of torque-transmitting mechanisms includes a first clutch and a variator bypass clutch. The first clutch is engageable to couple the first planetary gearset to the second planetary gearset to define a first power path therebetween. The variator bypass clutch is engageable to bypass the variable-ratio unit so that power transmitted along the first power path is transmitted to the variator bypass clutch rather than the variable-ratio unit. The power load received by the variable-ratio unit is reduced in at least one operating mode when the first clutch is engaged and the variator bypass clutch is engaged.

In some embodiments, the transmission may achieve a transmission ratio varying within a defined range when the variator bypass clutch is not engaged. The transmission may achieve a fixed transmission ratio when the variator bypass clutch is engaged.

In some embodiments, the second planetary gearset may include at least one idler-planet gear. The transmission may further include a third planetary gearset that may be arranged between the input shaft and the output shaft. The third planetary gearset may be coupled to the first planetary gearset. The transmission may further include a fourth planetary gearset that may be arranged between the input shaft and the output shaft. The fourth planetary gearset may be coupled to the second planetary gearset. The fourth planetary gearset may include at least one idler-planet gear.

According to another aspect of the present disclosure, a transmission is operable in a plurality of operating modes and includes an input shaft, a plurality of gearsets, a variable-ratio unit, and a plurality of torque-transmitting mechanisms. The input shaft is configured to receive torque from a drive unit and transmit the torque to an output shaft of the transmission. The plurality of gearsets are arranged between the input shaft and the output shaft. The plurality of gearsets includes a first planetary gearset coupled to the input shaft and a second planetary gearset coupled to the input shaft. The variable-ratio unit is coupled to the second planetary gearset and configured to receive a power load. The plurality of torque-transmitting mechanisms includes a first clutch and a second clutch. The first clutch is engageable to couple the first planetary gearset to the second planetary gearset to define a first power path therebetween. The second clutch is engageable to couple to the first planetary gearset to the second planetary gearset to define a second power path therebetween. The power load received by the variable-ratio unit is reduced in at least one operating mode when the first clutch is engaged and the second clutch is engaged.

In some embodiments, the transmission may further include a third planetary gearset. The third planetary gearset may be arranged between the input shaft and the output shaft and may be coupled to the first planetary gearset. The transmission may further include a fourth planetary gearset. The fourth planetary gearset may be arranged between the input shaft and the output shaft and may be coupled to the second planetary gearset.

In some embodiments, the transmission may achieve a fixed transmission ratio when the first clutch is engaged and the second clutch is engaged in a first operating mode. The first operating mode may enable a synchronous shift from a first forward range to a second forward range.

In some embodiments, the first planetary gearset may be configured to recirculate torque transmitted to the first planetary gearset from the input shaft to the second planetary gearset when the first clutch is engaged. The first planetary gearset may be configured to recirculate torque transmitted to the first planetary gearset from the input shaft to the second planetary gearset when the second clutch is engaged.

In some embodiments, a first junction may split the torque recirculated from the first planetary gearset to the second planetary gearset along the first power path to reduce the load received by the variable-ratio unit. A second junction may split the torque recirculated from the first planetary gearset to the second planetary gearset along the second power path to reduce the load received by the variable-ratio unit.

According to another aspect of the present disclosure, a transmission includes an input shaft, a variable-ratio unit, and a plurality of torque-transmitting mechanisms. The input shaft is configured to receive torque from a drive unit and transmit the torque to an output shaft of the transmission. The variable-ratio unit is configured to receive a power load. The plurality of torque-transmitting mechanisms are engageable to define a plurality of power paths between the input shaft and the output shaft. The plurality of torque-transmitting mechanisms includes a first clutch, a second clutch, and a third clutch. The first clutch, the second clutch, and the third clutch are engageable in combination with one another to transmit power along a first power path, a second power path, and a third power path. A first gearset included in the transmission is configured to transmit power from the input shaft to the output shaft along the first power path when the first clutch is engaged, recirculate power from the input shaft back to the input shaft along the second power path when the second clutch is engaged, and recirculate power from the input shaft back to the input shaft along the third power path when the third clutch is engaged.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 6 is a table showing the various operating modes achievable by the infinitely variable transmission of FIG. 1 and the transmission ratios associated with each mode;

DETAILED DESCRIPTION OF THE DRAWINGS

Figure 1:
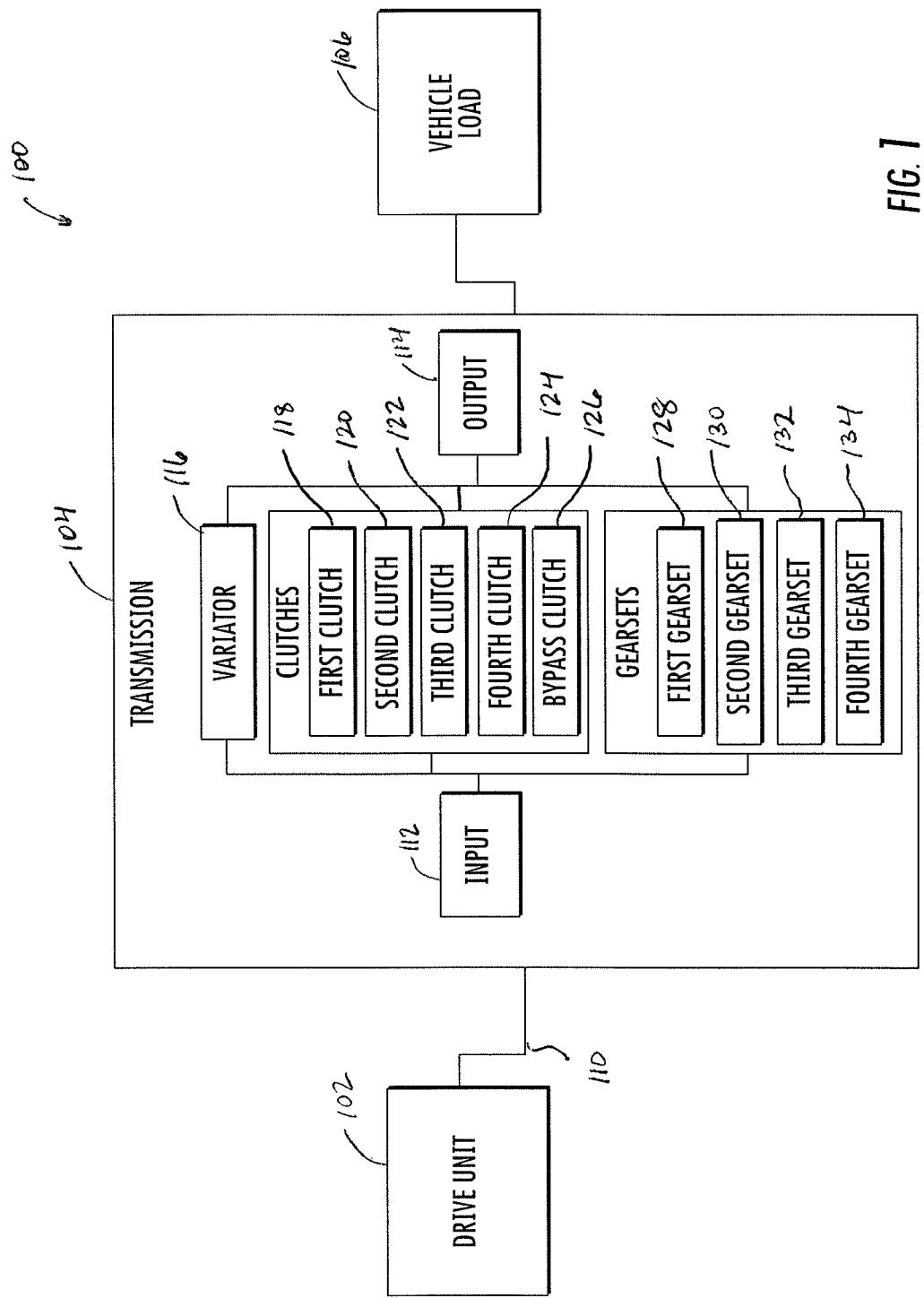
FIG. 1 is a simplified block diagram of an infinitely variable transmission including a variator.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative motor vehicle 100 includes a drive unit 102, a transmission 104 coupled to the drive unit 102, and a vehicle load 106 coupled to the transmission 104. The drive unit 102 may be embodied as any type of motor or internal combustion engine having a reciprocating or a rotary configuration that provides rotational power to the transmission 104 and therethrough to the vehicle load 106. For instance, the drive unit 102 may be embodied as a four-stroke piston engine, a diesel engine, or a rotary engine. The vehicle load 106 may be embodied as, or otherwise include, drive wheels, caterpillar tracks, propels, etc. that impart the motor vehicle 100 with locomotion when driven by the drive unit 102 via the transmission 106. Additionally, the vehicle load 106 may be an auxiliary gearbox (e.g. a transfer case or drop box) or a power take-off device, such as a pump, mixer, lifter, shoveler, compressor, compactor, or blower.

Rotational power is generated by the drive unit 102 and transmitted to the transmission 104 via a drive unit output shaft 110, included in the drive unit 102. The drive unit output shaft 110 is coupled to a transmission input shaft 112 included in the transmission 104. Additionally, rotational power from the transmission 104 is transmitted from a transmission output shaft 114 to the vehicle load 106.

The transmission 104 ensures the controlled application of rotational power generated by the drive unit 102 to the vehicle load 106. The transmission 104, as discussed below, includes a plurality of gearsets that enable speed and torque generated by the drive unit 102 to be converted for use by the vehicle load 106.

The transmission 104 is operable in a plurality of operating modes to transmit rotational power supplied by the drive unit 102 from the transmission input shaft 112 to the transmission output shaft 114. Each operating mode enables at least one ratio of input speed (i.e. at the transmission input shaft 112) to output speed (i.e. at the transmission output shaft 114) to be achieved. As discussed below, operating modes of the transmission 104 in which the variator 116 is utilized enable a range of transmission ratios to be achieved whereas operating modes in which the variator 116 is not utilized enable only a single transmission ratio to be achieved.

The transmission 104 of FIG. 1 is illustratively embodied as an infinitely variable transmission. The transmission 104 includes the variator 116, a plurality of clutches, and a plurality of gearsets in addition to the input shaft 112 and the output shaft 114. The plurality of clutches includes a first clutch 118, a second clutch 120, a third clutch 122, a fourth clutch 124, and a variator bypass clutch 126. The plurality of gearsets includes a first gearset 128, a second gearset 130, a third gearset 132, and a fourth gearset 134.

The infinitely variable transmission 104 is operable, as discussed below, to transmit rotational power supplied from the drive unit 112 to the variator 116 and the plurality of gearsets. The transmission 104 is also operable, in one operating mode, to achieve zero output speed at the output shaft 114 in what is referred herein to as a "geared neutral mode." The transmission 104 is also operable to recirculate rotational power directed toward the output shaft 114 back toward the input shaft 112 in multiple operating modes. As discussed below, power recirculated back toward the input shaft 112 and received by the variator 116 is reduced as a result of the architecture of the infinitely variable transmission 104.

The variator 116, the plurality of clutches, and the plurality of gearsets included in the transmission 104 are arranged between the input shaft 112 and the output shaft 114 of the transmission 104. Each of the gearsets may be supported by a mainshaft of the transmission 104 and may be capable of rotating freely and independently thereof. Each of the clutches may be selectively engaged to transmit power along a particular path as discussed below.

Each of the plurality of clutches included in the transmission 104 is embodied as a torque-transmitting device configured to define a torque transfer path between components included in the transmission 104. In combination, the plurality of clutches define a torque transfer path between the input shaft 112 and the output shaft 114 and thereby effect a change from one operating mode to another. In one example, one or more of the plurality of clutches may be embodied as a three-position dog clutch such as the three-position dog clutch disclosed in U.S. Provisional Patent App. Ser. No. 61/799,200 entitled "THREE-POSITION DOG CLUTCH" by Brian Schoolcraft, the entirety of which is hereby incorporated by reference. In other embodiments, one or more of the plurality of clutches may be embodied as a multi-plate wet clutches or controllable mechanical diodes, the engagement/disengagement of which are used to accomplish changes between operating modes. As discussed below, the second clutch 120, the third clutch 122, the fourth clutch 124, and the variator bypass clutch 126 are rotating clutches while the first clutch 118 is a stationary, non-rotating clutch.

The variator bypass clutch 126, as discussed below, is engageable to lock a variator input ring 136 to a variator output ring 140 so that the variator 116 achieves a 1:1 ratio (i.e. variator input speed is equal to variator output speed). When the variator bypass clutch 126 is engaged, the power load experienced by the variator 116 is removed, and all the power transmitted to the variator 116 flows instead through the variator bypass clutch 126.

Figure 2:
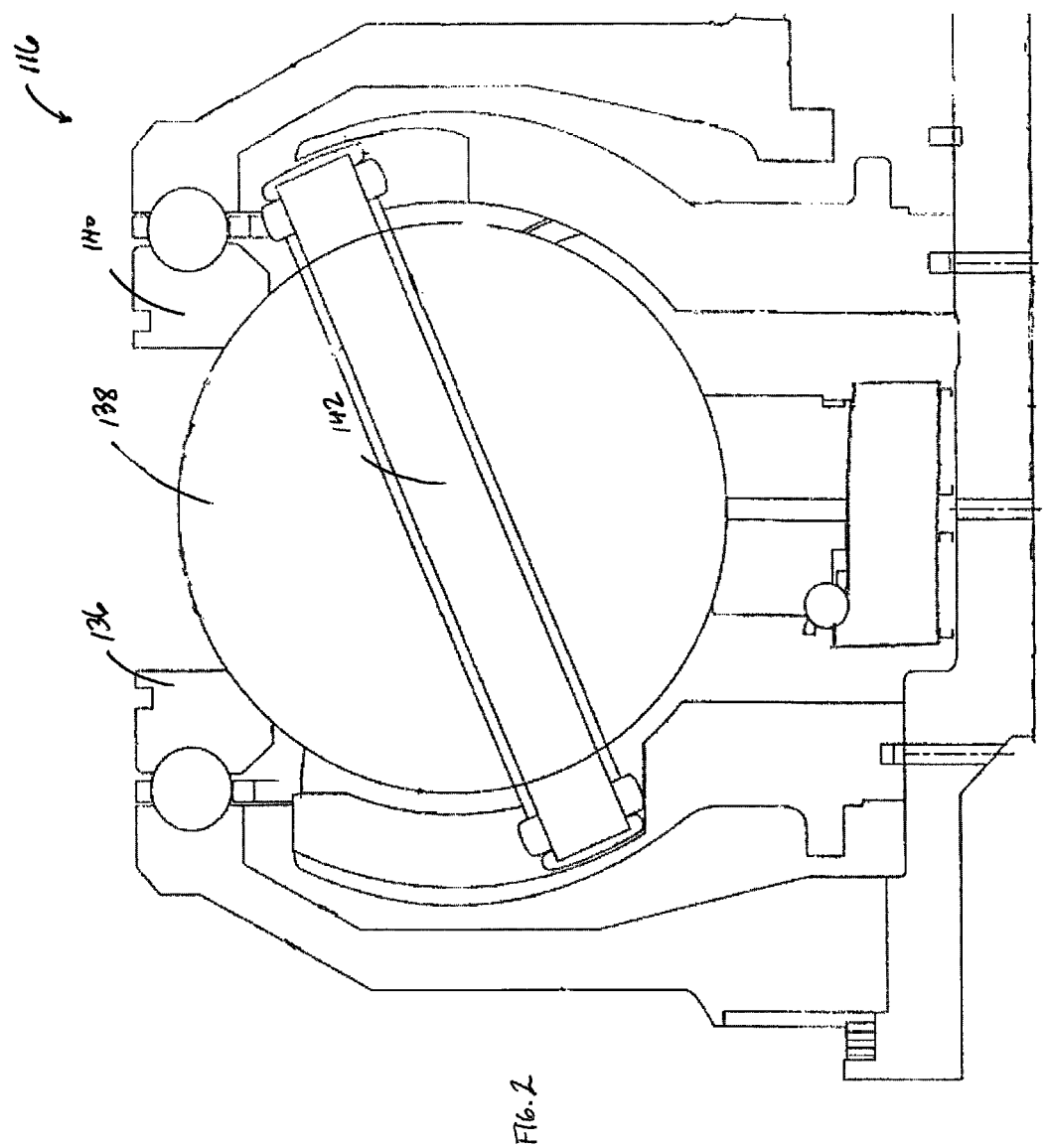
FIG. 2 is a diagrammatic view of the variator of the infinitely variable transmission of FIG. 1.

Referring now to FIG. 2, the variator 116 includes the input ring 136 and the output ring 140. The variator 116 is illustratively embodied as a planetary-type ball variator. Each of the variator rings 136, 140 are spaced apart as shown in FIG. 2 to permit a ball 138 to be positioned between the rings 136, 140. The ball 138 is configured to tilt between the rings 136, 140 to vary the ratio achieved using the variator 116. An axle 142 encircles the ball 138 as shown in FIG. 2. The ball 138 is tilted by continuously tilting the axle 142 so that continuously-variable torque output is produced using the variator 116.

Figure 3:
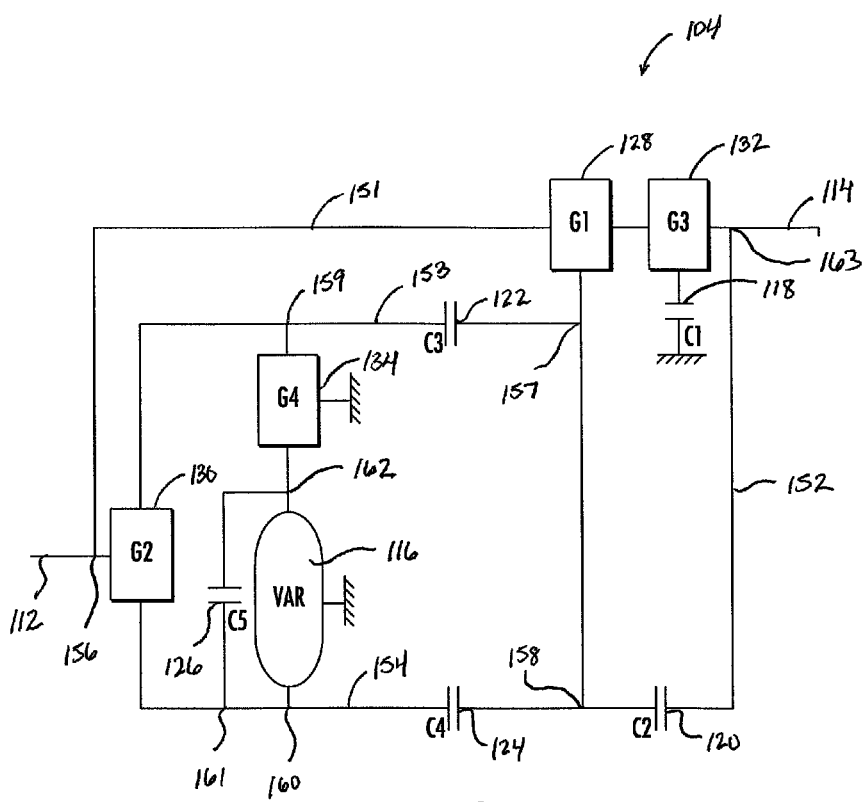
FIG. 3 is a block diagrammatic view of the architecture of the infinitely variable transmission of FIG. 1 showing various components included in the infinitely variable transmission.

Referring now to FIG. 3, the architecture of the transmission 104 is shown in which each of the gearsets are represented in boxes (i.e. G1, G2, G3, and G4) and the variator 116 is designated as "VAR." G1 designates the first gearset 128, G2 represents the second gearset 130, G3 represents the third gearset 132, and G4 designates the fourth gearset 134. The clutches are each represented by pairs of parallel lines and designated as the following: C1 (the first clutch 118), C2 (the second clutch 120), C3 (the third clutch 122), C4 (the fourth clutch 124), and C5 (the variator bypass clutch 126).

The architecture of the transmission 104 defines a plurality of power paths along which power is transmitted between components included in the transmission 102. The plurality of power paths include a first outer power path 151 that utilizes one or both of a third inner power path 153 and a fourth inner power path 154 to transmit power from the input shaft 112 to the output shaft 114. The plurality of power paths also includes a second outer power path 152 that utilizes one or both of the third inner power path 153 and the fourth inner power path 154 to transmit power from the input shaft 112 to the output shaft 114. As illustrated in FIGS. 7-10, power flow along each of the paths 151, 152, 153, 154 may be uni-directional or bi-directional in the plurality of operating modes of the transmission 104. In each operating mode of the transmission 104, power is transmitted between the input shaft 112 and the output shaft 114 along at least one of the outer power paths 151, 152 and at least one of the inner power paths 153, 154. As indicated below, power flow from the input shaft 112 to the output shaft 114 along more than one outer power path (i.e., both outer paths 151,152) or more than one inner path (i.e., both inner paths 153, 154) allows the transmission 104 to achieve a fixed ratio.

The first outer power path 151 is defined at least in part by the first gearset 128, the third gearset 132, and the first clutch 118. As indicated above, the first outer power path 151 utilizes one or both of the third and fourth inner power paths 153, 154 to transmit power from the input shaft 112 to the output shaft 114. The input side of the first outer power path 151 is defined at the junction 156. The junction 156 may be a coupling permitting power received by the input shaft 112 to be transmitted along the first outer power path 151 and toward or away from the first gearset 128. The junction 156 also permits power received by the input shaft 112 to be transmitted to or from the second gearset 130. The first outer power path 151 is "input coupled" in that the input side of the first outer power path 151 is coupled to the junction 156 and the output side of the first outer power path 151 is coupled to the first gearset 128. Power may be transmitted along the first outer power path 151 from the junction 156 to the first gearset 128, and power transmitted to the first gearset 128 may be transmitted thereafter to the third gearset 132 (i.e., along the first outer power path 151) or recirculated along one of or both of the inner power paths 153, 154 as shown in FIGS. 7A-7D.

As illustrated in FIGS. 7A-7D, the first gearset 128 is a "mixing" planetary gearset that allows power transmitted thereto to be transmitted to the third gearset 132 along the first outer power path 151, recirculated back toward the input shaft 112 along either one or both of the inner power paths 153, 154, and split so that effectively half of the power transmitted to the first gearset 128 is recirculated toward the input shaft 112 along both inner power paths 153, 154 as shown in FIGS. 7A-7D. Each component of the first gearset 128 rotates and is configured to transmit power (i.e., no component of the first gearset 128 is grounded).

Each of the outer power paths 151, 152 utilize a "fixed" and a "variable" portion to transmit power. Power transmitted along the "fixed" portion is power transmitted at a fixed mechanical ratio. Conversely, power transmitted along the "variable" portion is power transmitted over a continuously-variable ratio range, i.e., power that is transmitted through the variator 116. Each of the inner power paths 153, 154 also utilize a "fixed" and a "variable" portion similar to the path 151, 152. The "fixed" and "variable" portions of each power path are described in more detail below.

The second outer power path 152 is defined at least in part by the second clutch 120. As indicated above, the second outer power path 152 utilizes one or both of the third and fourth inner power paths 153, 154 to transmit power from the input shaft 112 to the output shaft 114. The second outer power path 152 is "direct" in that power transmitted along the second outer power path 152 is not split or recirculated as shown in FIGS. 8C-10B. Power directed to one of the inner power paths 153, 154 from the second outer power path 152, however, may be split and/or recirculated as shown in FIGS. 8C-10B.

The "fixed" portion of the first outer power path 151 is associated with power flowing from the junction 156 to the first gearset 128 and from the first gearset 128 to the output shaft 114 through the third gearset 132. The "variable" portion of the first outer power path 151 may be associated with power flowing from the first gearset 128 to a junction 157 and therefrom to the second gearset 130 along the third inner power path 153 when the third clutch 122 is engaged. The "variable" portion of the first outer power path 151 may also be associated with power flowing from the first gearset 128 to a junction 158 and therefrom to the second gearset 130 along the fourth inner power path 154 when the fourth clutch 124 is engaged.

The "fixed" portion of the second outer power path 152 is associated with power flowing from the junction 158 to the third gearset 132 and therefrom to the output shaft 114. The "variable" portion of the second outer power path 152 is associated with power flowing along either of the inner power paths 153, 154.

Both the third and fourth inner power paths 153, 154 are defined at least in part by the second gearset 130 as shown in FIG. 3. Similar to the first gearset 128, the second gearset 130 is a "mixing" planetary gearset that allows power transmitted thereto to be transmitted along one or both of the third and fourth inner power paths 153, 154, combined (i.e., a first split power flow combines with a second split power flow at the second gearset 130), recirculated back toward the junction 156, and split so that effectively half of the power transmitted to the second gearset 130 is circulated along both inner power paths 153, 154 as shown in FIGS. 7A-7D. Each component of the second gearset 130 rotates and is configured to transmit power (i.e., no component of the first gearset 130 is grounded).

The "fixed" portion of the third inner power path 153 is associated with power flowing between the second gearset 130 and the junction 159 when the third clutch 122 is engaged. The "variable" portion of the third inner power path 153 is associated with power flowing between the junction 159 and a junction 160 (i.e., through the fourth gearset 134 and the variator 116) when the third clutch 122 is engaged.

The "fixed" portion of the fourth inner power path 154 is associated with power flowing between the second gearset 130 and the junction 160 when the fourth clutch 124 is engaged. The "variable" portion of the fourth inner power path 154 is associated with power flowing between the junction 159 and the junction 160 (i.e., through the fourth gearset 134 and the variator 116) when the fourth clutch 124 is engaged.

Each of the third inner power paths 153, 154 are "output coupled" in that the input side of each of the power paths 153, 154 is coupled to the second gearset 130 and the output side of each of the power paths 153, 154 is coupled to the junction 157 and the junction 158, respectively. The transmission 104 is configured in a "nested" architecture as indicated above so that power may be transmitted between the input shaft 112 and the output shaft 114 along the first outer power path 151 and the third inner power path 153 (an input coupled and output coupled power path), the first outer power path 151 and the fourth inner power path 154 (an input coupled and output coupled power path), the second outer power path 152 and the third inner power path 153 (direct and output coupled power flow), and the second outer power path 152 and the fourth inner power path (direct and output coupled power flow).

Figure 4:
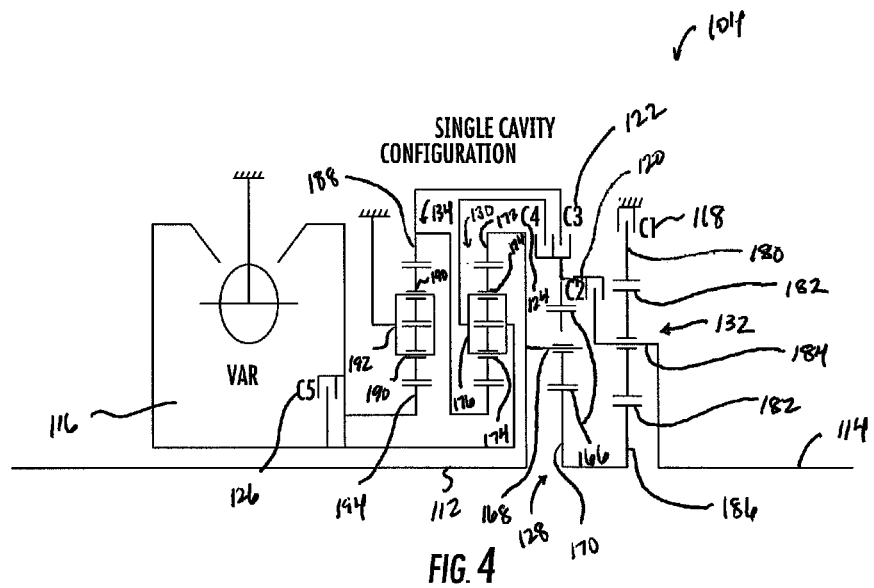
FIG. 4 is a schematic of the architecture of FIG. 3 and the associated transmission components in which the variator is in a first configuration.
Figure 5:
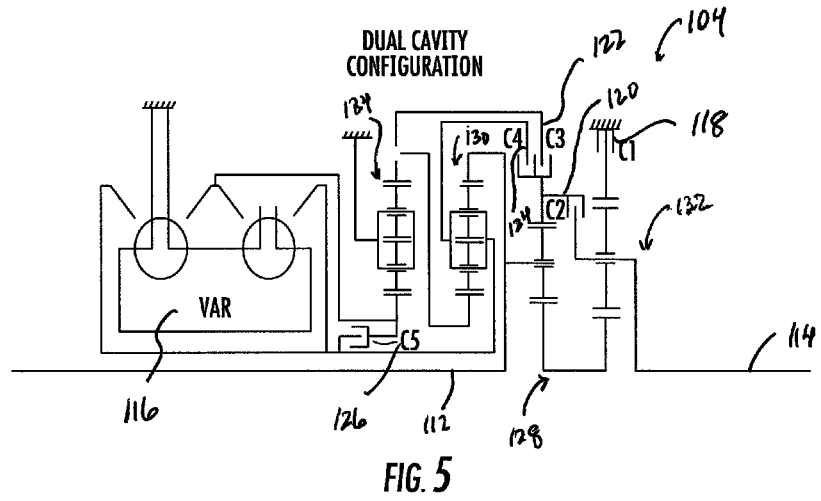
FIG. 5 is a schematic of the architecture of FIG. 3 and the associated transmission components in which the variator is in a second configuration.

Referring now to FIG. 4, the variator 116, the plurality of gearsets, and the plurality of clutches are arranged in a "single cavity" configuration of the transmission 104. As indicated above and shown in FIG. 3, the variator 116, the plurality of gearsets, and the plurality of clutches are arranged between the input shaft 112 and the output shaft 114. The variator 116 may be positioned in front of the plurality of clutches and the plurality of gearsets relative to the input shaft 112 as shown in FIGS. 4-5. The components included in each gearset as well as the interrelationships between each gearset are discussed below.

The first gearset 128 is configured to receive power from the input shaft 112 that is transmitted to the junction 156 and thereafter to the first gearset 128 along the first outer power path 151 as suggested in FIG. 4. The first gearset 128 is illustratively a simple planetary gearset that includes a ring gear 164, a plurality of planet gears 166, a carrier 168, and a sun gear 170. Each of the planet gears 166 is intermeshed with the ring gear 164 and the sun gear 170, and each of the planet gears 166 is supported for rotation by the carrier 168. Power from the input shaft 112 is transmitted to the junction 156 and along the first outer path 151 to the carrier 168. The sun gear 170 of the first gearset 128 is coupled to the third gearset 132 to transmit power between the first gearset 128 and the third gearset 132. The third clutch 122 is engageable to couple the ring gear 164 to the fourth gearset 134 to transmit power between the first gearset 128 and the fourth gearset 134 along the third inner power path 153. The fourth clutch 124 is engageable to couple the ring gear 164 to the second gearset 130 to transmit power between the first gearset 128 and the second gearset 130 along the first outer power path 151 and the fourth inner power path 154. The second clutch 120 is engageable to couple the ring gear 164 to the third gearset 132 to transmit power between the first gearset 128 and the third gearset 132 along the second outer power path 152.

The second gearset 130 is configured to receive power from the input shaft 112 that is transmitted to the junction 156 and thereafter to the second gearset 130 as suggested in FIG. 4. The second gearset 130 is illustratively an idler-planet planetary gearset that includes a ring gear 172, a plurality of planet gears 174 including one or more idler-planet gears, a carrier 176, and a sun gear 178. Each of the planet gears 174 is intermeshed with either the ring gear 172 or the sun gear 178 and another one of the planet gears 174, and each of the planet gears 174 is supported for rotation by the carrier 176. Power from the input shaft 112 is transmitted from the junction 156 to the ring gear 172. The carrier 176 is coupled to the variator 116 so that power is transmitted between the carrier 176 and the variator 116 along the fourth inner power path 154. The variator bypass clutch 126 is engageable to bypass the variator 116 so that power may be transmitted between the carrier 176 and the fourth gearset 134 rather than the variator 116 as discussed below. The fourth clutch 124 is engageable to couple the carrier 176 to the first gearset 128 to transmit power between the second gearset 130 and the first gearset 128 along the fourth inner power path 154 and the second outer power path 152 as indicated above.

The third gearset 132 is configured to receive power transmitted along the first outer power path 151 as suggested in FIG. 4. The third gearset 132, similar to the first gearset 128, is illustratively a simple planetary gearset that includes a ring gear 180, a plurality of planet gears 182, a carrier 184, and a sun gear 186. Each of the planet gears 182 is intermeshed with the ring gear 180 and the sun gear 186, and each of the planet gears 182 is supported for rotation by the carrier 184. The first clutch 118 is engageable to couple the ring gear 180 to a stationary, non-rotating part of the transmission 104, thereby preventing the ring gear 180 from rotating (i.e. braking the ring gear 180). For instance, the first clutch 118 may be engaged to couple the ring gear 180 to the housing of the transmission 104. The sun gear 186 is coupled to the sun gear 170 to transmit power between the third gearset 132 and the first gearset 128 along the first outer power path 151. The second clutch 120 is engageable to couple the ring gear 164 to the carrier 184 to transmit power between the third gearset 132 and the first gearset 128 along the first and second outer power paths 151, 152. The carrier 184 of the third gearset 132 is coupled to the output shaft 114 as shown in FIG. 4.

The fourth gearset 134 is configured to receive power transmitted along at least one of the third inner power path 153 and the fourth inner power path 154 as suggested in FIG. 4. The fourth gearset 134 is illustratively an idler-planet planetary gearset that includes a ring gear 188, a plurality of planet gears 190 including one or more idler-planet gears, a carrier 192, and a sun gear 194. Each of the planet gears 190 is intermeshed with either the ring gear 188 or the sun gear 194 and one of the planet gears 190, and each of the planet gears 190 is supported for rotation by the carrier 192. The carrier 192 is grounded to a stationary, non-rotating part of the transmission 104 which prevents the carrier 192 from rotating (i.e. brakes the carrier 192). The third clutch 122 is engageable to couple the ring gear 188 to the first gearset 128 to transmit power between the fourth gearset 134 and the first gearset 128 along the third inner power path 153 and the first outer power path 151. The ring gear 188 is coupled to the sun gear 178 to transmit power between the fourth gearset 134 and the second gearset 130 along the third inner power path 153. The sun gear 194 is coupled to the variator 116 to transmit power between the fourth gearset 134 and the variator 116. The variator bypass clutch 126 is engageable to bypass the variator 116 so that power is transmitted between the second gearset 130 and the fourth gearset 134 as discussed below.

Referring now to FIG. 5, the variator 116, the plurality of gearsets, and the plurality of clutches are arranged in a "dual cavity" configuration of the transmission 104. The components included in each gearset and the interrelationships between each gearset as described above are the same for both the "dual cavity" and "single cavity" configurations. The clutches are engageable to define paths along which power is transmitted between gearsets as described above in both the "dual cavity" and "single cavity" configurations In either the "single cavity" configuration shown in FIG. 4 or the "double cavity" configuration shown in FIG. 5, a power take-off device (not shown) may be coupled to the variator 116 to transmit power from the drive unit 102 to the variator 116 and therefrom to the power-take off device. For instance, the power take-off device may be coupled to the output ring 140 of the variator 116. When the transmission 104 is placed in a neutral range, the variator 116 may be used to continuously vary the ratio of the power-take off device relative to the rotational speed of the drive unit output shaft 110 and the transmission input shaft 112.

Referring now to FIG. 6, a table 600 illustrates the various operating modes of the transmission 104, the clutches applied in each mode, and the transmission ratio(s) achieved in each mode. The transmission 104 is operable in four operating modes to achieve a variable transmission ratio within a defined transmission ratio range. In all other operating modes, as discussed below, the transmission 104 achieves a single transmission ratio.

The transmission 104 is operable in the "Mode 1" operating mode, when the first clutch 118 and the fourth clutch 124 are engaged as shown in FIG. 6, to achieve a variable transmission ratio (i.e., ratio of output speed to input speed) within the range of −0.25 (minimum) to 0.21 (maximum). As suggested above, the variable transmission ratio is achievable in "Mode 1" as a result of utilizing the variator 116. The "Mode 1" operating mode covers a reverse range (i.e. a ratio from −0.25 to 0), and a low forward range (i.e. a ratio from 0 to 0.21) as shown in FIG. 6. As suggested above, the "Mode 1" operating mode permits the transition from the reverse range to the forward range and thereby serves as the geared neutral mode in this respect.

The transmission 104 is operable in the "Bypass 1" operating mode, when the first clutch 118, the fourth clutch 124, and the variation bypass clutch 126 are engaged as shown in FIG. 6, to achieve a fixed transmission ratio of −0.03. Because the variator 116 is bypassed in the "Bypass 1" mode, only a single fixed transmission ratio is achieved by the transmission 104. The "Bypass 1" operating mode covers a reverse range as shown in FIG. 6. The ratio achieved by the transmission 104 in the "Bypass 1" operating mode falls substantially midway between the minimum and maximum values defining the variable ratio range of the "Mode 1" operating mode.

The transmission 104 is operable in the "Sync 1-2" operating mode, when the first clutch 118, the third clutch 122, and the fourth clutch 124 are engaged as shown in FIG. 6, to achieve a fixed transmission ratio of 0.21. The ratio of 0.21 coincides with the maximum ratio achieved in the "Mode 1" operating mode and the minimum ratio achieved in the "Mode 2" operating mode (discussed below) so that the "Sync 1-2" operating mode effects a transition (i.e. a synchronous shift) between those two modes. A single fixed transmission ratio is achieved by the transmission 104 in the "Sync 1-2" mode because the variator 116 is effectively bypassed. The "Sync 1-2" operating mode covers a low forward range as shown in FIG. 6.

The transmission 104 is operable in the "Mode 2" operating mode, when the first clutch 118 and the third clutch 122 are engaged as shown in FIG. 6, to achieve a variable transmission ratio within the range of 0.21 (minimum) to 0.50 (maximum). As suggested above, the variable transmission ratio is achievable in "Mode 2" as a result of utilizing the variator 116. The "Mode 2" operating mode covers a low forward range to a mid forward range as shown in FIG. 6.

The transmission 104 is operable in the "Bypass 2" operating mode, when the first clutch 118, the third clutch 122, and the variation bypass clutch 126 are engaged as shown in FIG. 6, to achieve a fixed transmission ratio of 0.36. Because the variator 116 is bypassed in the "Bypass 2" mode, only a single fixed transmission ratio is achieved by the transmission 104. The "Bypass 2" operating mode covers a low forward range as shown in FIG. 6. The ratio achieved by the transmission 104 in the "Bypass 2" operating mode falls substantially midway between the minimum and maximum values defining the variable ratio range of the "Mode 2" operating mode.

The transmission 104 is operable in the "Sync 2-3" operating mode, when the first clutch 118, the second clutch 120, and the third clutch 122 are engaged as shown in FIG. 6, to achieve a fixed transmission ratio of 0.50. The ratio of 0.50 coincides with the maximum ratio achieved in the "Mode 2" operating mode and the minimum ratio achieved in the "Mode 3" operating mode (discussed below) so that the "Sync 2-3" operating mode effects a transition (i.e. a synchronous shift) between those two modes. A single fixed transmission ratio is achieved by the transmission 104 in the "Sync 2-3" mode because the variator 116 is effectively bypassed. The "Sync 2-3" operating mode covers a mid forward range as shown in FIG. 6.

The transmission 104 is operable in the "Mode 3" operating mode, when the second clutch 120 and the third clutch 122 are engaged as shown in FIG. 6, to achieve a variable transmission ratio within the range of 0.50 (minimum) to 1.00 (maximum). As suggested above, the variable transmission ratio is achievable in "Mode 3" as a result of utilizing the variator 116. The "Mode 3" operating mode covers a mid forward range to a high forward range as shown in FIG. 6.

The transmission 104 is operable in the "Bypass 3" operating mode, when the second clutch 120, the third clutch 122, and the variator bypass clutch 126 are engaged as shown in FIG. 6, to achieve a fixed transmission ratio of 0.74. Because the variator 116 is bypassed in the "Bypass 3" mode, only a single fixed transmission ratio is achieved by the transmission 104. The "Bypass 3" operating mode covers a mid forward range as shown in FIG. 6. The ratio achieved by the transmission 104 in the "Bypass 3" operating mode falls substantially midway between the minimum and maximum values defining the variable ratio range of the "Mode 3" operating mode.

The transmission 104 is operable in the "Sync 3-4" operating mode, when the second clutch 120, the third clutch 122, and the fourth clutch 124 are engaged as shown in FIG. 6, to achieve a fixed transmission ratio of 1.00. The ratio of 1.00 coincides with the maximum ratio achieved in the "Mode 3" operating mode and the minimum ratio achieved in the "Mode 4" operating mode (discussed below) so that the "Sync 3-4" operating mode effects a transition (i.e. a synchronous shift) between those two modes. A single fixed transmission ratio is achieved by the transmission 104 in the "Sync 3-4" mode because the variator 116 is effectively bypassed. The "Sync 3-4" operating mode covers a high forward range as shown in FIG. 6.

The transmission 104 is operable in the "Mode 4" operating mode, when the second clutch 120 and the fourth clutch 124 are engaged as shown in FIG. 6, to achieve a variable transmission ratio within the range of 1.00 (minimum) to 1.80 (maximum). As suggested above, the variable transmission ratio is achievable in "Mode 4" as a result of utilizing the variator 116. The "Mode 4" operating mode covers a high forward range to a full overdrive forward range as shown in FIG. 6.

The transmission 104 is operable in the "Bypass 4" operating mode, when the second clutch 120, the fourth clutch 124, and the variator bypass clutch 126 are engaged as shown in FIG. 6, to achieve a fixed transmission ratio of 1.41. Because the variator 116 is bypassed in the "Bypass 4" mode, only a single fixed transmission ratio is achieved by the transmission 104. The "Bypass 4" operating mode covers an overdrive forward range as shown in FIG. 6. The ratio achieved by the transmission 104 in the "Bypass 4" operating mode falls substantially midway between the minimum and maximum values defining the variable ratio range of the "Mode 4" operating mode.

Referring now to FIGS. 7-10, power flow from the input shaft 112 to the output shaft 114 along the plurality of power paths defined by the architecture of the transmission 104 is illustrated in each of the operating modes discussed above. Each of FIGS. 7-10 refers to the architecture of the transmission 104 as shown in FIG. 3.

Figure 7A:
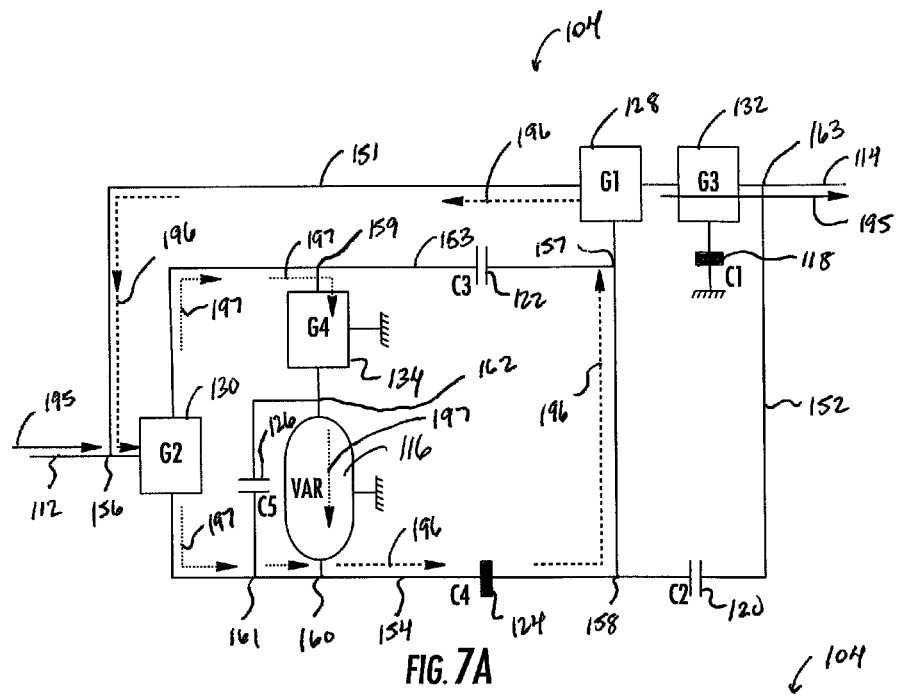
FIG. 7A is a block diagrammatic view of the infinitely variable transmission of FIG. 1 showing power flow therethrough in a first reverse operating mode.

Referring now to FIG. 7A, power flow from the input shaft 112 to the output shaft 114 of the transmission 104 in the reverse range covered by the "Mode 1" operating mode is shown. As indicated above, the first clutch 118 and the fourth clutch 124 are each engaged in the "Mode 1" operating mode. Input power 195 (designated by the solid arrows) flows from the input shaft 112 to the junction 156 and thereafter to the second gearset 130. Though not shown in FIG. 7A, input power 195 initially circulated through the transmission 104 to the second gearset 130 is split by the second gearset 130 and transmitted to the junction 159 and along the fourth inner power path 154 to the junction 158. Input power 195 is transmitted to the fourth gearset 134 from the junction 159 and therethrough to the junction 162 where it is transmitted to the variator 116. Input power 195 passing through the variator 116 is combined with input power 195 flowing along the fourth inner power path 154 at the junction 160 and transmitted thereafter to the junction 158. Input power 195 is transmitted from the junction 158 to the first gearset 128 and thereafter to the third gearset 132. Input power 195 is transmitted from the third gearset 132 to the output shaft 114 along the first outer power path 151 as shown in FIG. 7A.

The first gearset 128 is operable to recirculate a portion of the input power 195 away from the output shaft 114 and toward the input shaft 112. Recirculated power 196 (designated by the dashed arrows) flows from the first gearset 128 to the junction 156 along the first outer power path 151 and from the junction 156 to the second gearset 130 as shown in FIG. 7A. The recirculated power 196 is combined with the input power 195 received by the input shaft 112 from the drive unit 102 at the junction 156. As a result, the recirculated power 196 flowing from the junction 156 to the second gearset 130 is greater than the input power 195 initially transmitted to the input shaft 112 by the drive unit 102.

The recirculated power 196 is transmitted to the second gearset 130 from the junction 156 as indicated above. The second gearset 130 is operable to split the recirculated power 196 so that split recirculated power 197 (designated by the dotted arrows) is transmitted to the junction 159 and to the junction 160 along the fourth inner power path as shown in FIG. 7A. The split recirculated power 197 is transmitted from the junction 159 to the junction 160 (through the fourth gearset 134 and the variator 116) where it is combined with the split recirculated power 197 flowing to the junction 160 along the fourth inner power path 154. Therefore, at the junction 160, the split recirculated power 197 becomes the recirculated power 196. The recirculated power 196 flows from the junction 160 along the fourth inner power path 154 to the junction 158 where it is transmitted thereafter to the first gearset 128. From the first gearset 128, a portion of the recirculated power 196 may be transmitted to the output shaft 114 and a portion of the recirculated power 196 may be recirculated back to the junction 156 along the first outer power path 151.

Figure 7B:
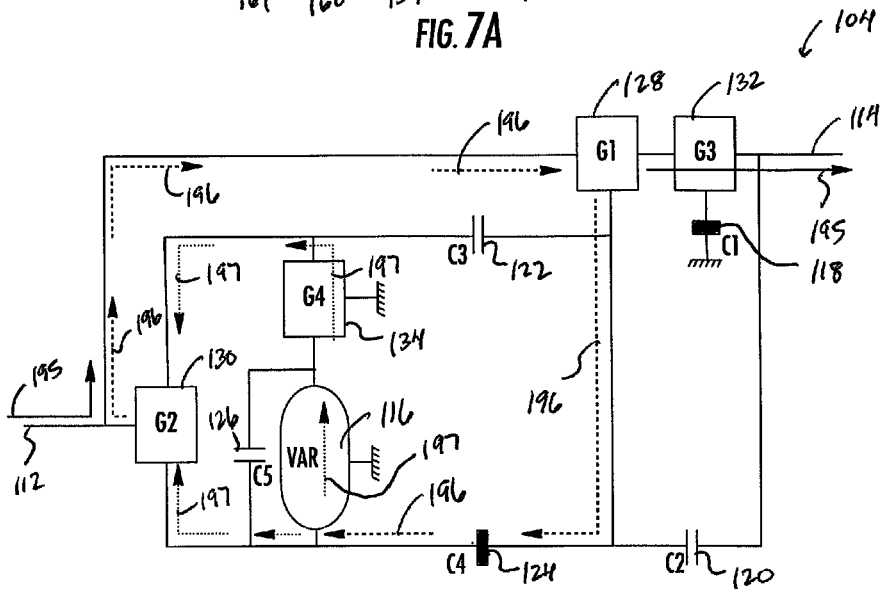
FIG. 7B is a block diagrammatic view of the infinitely variable transmission of FIG. 1 showing power flow therethrough in a first forward operating mode.

Referring now to FIG. 7B, power flow from the input shaft 112 to the output shaft 114 of the transmission 104 in the forward range covered by the "Mode 1" operating mode is shown. Input power 195 initially flows from the input shaft 112 to the junction 156 and thereafter to the first gearset 128 along the first outer power path 151. Input power 195 flows from the first gearset 128 to the third gearset 132 and thereafter to the output shaft 114 along the first outer power path 151 as shown in FIG. 7B.

The first gearset 128 recirculates a portion of the input power 195 away from the output shaft 114 and toward the input shaft 112 as indicated above and as shown in FIG. 7B. Recirculated power 196 flows from the first gearset 128 to the junction 158 and from the junction 158 to the junction 160 along the fourth outer power path 154 as shown in FIG. 7B.

The recirculated power 196 transmitted to the junction 160 is split at the junction 160 so that split recirculated power 197 flows along the fourth inner power path 154 to the second gearset 130 and split recirculated power 197 flows from the junction 160 to the junction 159 (through the variator 116 and the fourth gearset 134) as shown in FIG. 7B. The split recirculated power 197 flowing from the junction 159 to the second gearset 130 is combined with the split recirculated power 197 flowing from the junction 160 to the second gearset 130 along the fourth inner power path 154 at the second gearset 130. Therefore, the split recirculated power 197 becomes the recirculated power 196 that is transmitted from the second gearset 130 to the junction 156 as shown in FIG. 7B.

The recirculated power 196 transmitted to the junction 156 is combined with the input power 195 received at the input shaft 112 from the drive unit 102 as suggested in FIG. 7B. As a result, the recirculated power 196 transmitted from the junction 156 to the first gearset 128 is greater than the input power 195 initially transmitted to the junction 156 from the drive unit 102. From the first gearset 128, a portion of the recirculated power 196 may be transmitted to the output shaft 114 and a portion of the recirculated power 196 may be recirculated back to the junction 158.

Figure 7C:
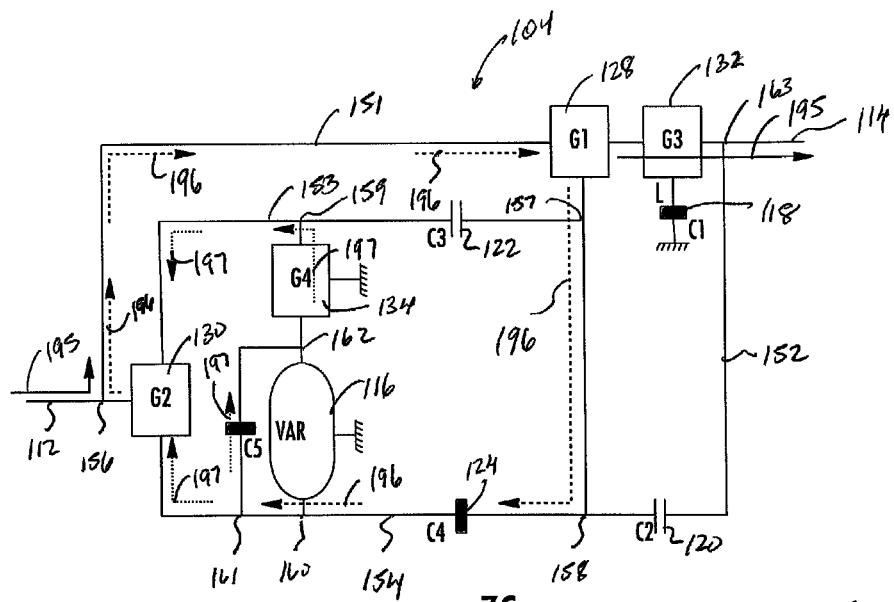
FIG. 7C is a block diagrammatic view of the infinitely variable transmission of FIG. 1 showing power flow therethrough in a first variator bypass operating mode.

Referring now to FIG. 7C, power flow from the input shaft 112 to the output shaft 114 of the transmission 104 in the "Bypass 1" operating mode is shown. As indicated above, the first clutch 118, the fourth clutch 124, and the variator bypass clutch 126 are each engaged in the "Bypass 1" operating mode. The variator bypass clutch 126 is configured to reduce the load experienced by the variator 116 by locking the variator input (i.e. disc 136) to the variator output (i.e. disc 140) so that the variator 116 achieves a 1:1 ratio and is effectively bypassed.

Input power 195 initially flows from the input shaft 112 to the junction 156 and thereafter to the first gearset 128 along the first outer power path 151 as shown in FIG. 7C. Input power 195 flows from the first gearset 128 to the third gearset 132 and thereafter to the output shaft 114 along the first outer power path 151 as shown in FIG. 7C.

The first gearset 128 recirculates a portion of the input power 195 away from the output shaft 114 and toward the input shaft 112 as indicated above and as shown in FIG. 7C. Recirculated power 196 flows from the first gearset 128 to the junction 158 and from the junction 158 to the junction 161 along the fourth outer power path 154 as shown in FIG. 7C.

The recirculated power 196 transmitted to the junction 161 is split at the junction 161 so that split recirculated power 197 flows along the fourth inner power path 154 to the second gearset 130 and split recirculated power 197 flows from the junction 161 to the junction 159 (through the variator bypass clutch 126 and the fourth gearset 134) as shown in FIG. 7C. The split recirculated power 197 flowing from the junction 159 to the second gearset 130 is combined with the split recirculated power 197 flowing from the junction 161 to the second gearset 130 along the fourth inner power path 154 at the second gearset 130. Therefore, the split recirculated power 197 becomes the recirculated power 196 that is transmitted from the second gearset 130 to the junction 156 as shown in FIG. 7C.

The recirculated power 196 transmitted to the junction 156 is combined with the input power 195 received at the input shaft 112 from the drive unit 102 as suggested in FIG. 7C. As a result, the recirculated power 196 transmitted from the junction 156 to the first gearset 128 is greater than the input power 195 initially transmitted to the junction 156 from the drive unit 102. From the first gearset 128, a portion of the recirculated power 196 may be transmitted to the output shaft 114 and a portion of the recirculated power 196 may be recirculated back to the junction 158.

Figure 7D:
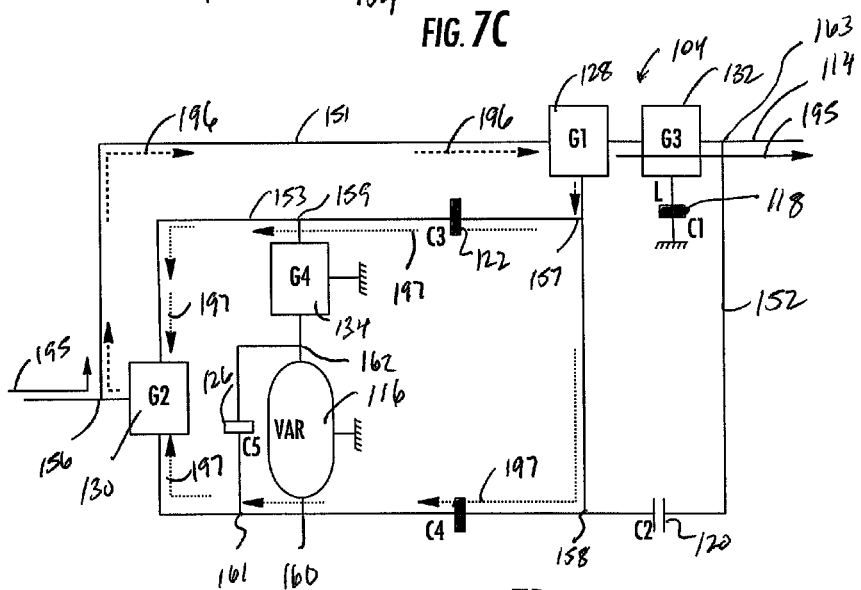
FIG. 7D is a block diagrammatic view of the infinitely variable transmission of FIG. 1 showing power flow therethrough in a first synchronous operating mode.

Referring now to FIG. 7D, power flow from the input shaft 112 to the output shaft 114 of the transmission 104 in the "Sync 1-2" operating mode is shown. As indicated above, the first clutch 118, the third clutch 122, and the fourth clutch 124 are each engaged in the "Sync 1-2" operating mode. As discussed below, the simultaneous power flow from the junction 157 to the second gearset 130 along the third inner power path 153 and from the junction 158 to the second gearset 130 along the fourth inner power path 154 effectively bypasses the variator 116 to reduce the load experienced by the variator 116 in the "Sync 1-2" operating mode.

Input power 195 initially flows from the input shaft 112 to the junction 156 and thereafter to the first gearset 128 along the first outer power path 151 as shown in FIG. 7D. Input power 195 flows from the first gearset 128 to the third gearset 132 and thereafter to the output shaft 114 along the first outer power path 151 as shown in FIG. 7D.

The first gearset 128 recirculates a portion of the input power 195 away from the output shaft 114 and toward the input shaft 112 as indicated above and as shown in FIG. 7D. Recirculated power 196 flows from the first gearset 128 to the junction 157 as shown in FIG. 7D.

The recirculated power 196 transmitted to the junction 157 is split at the junction 157 so that split recirculated power 197 flows along the fourth inner power path 154 to the second gearset 130 and split recirculated power 197 flows along the third inner power path 153 to the second gearset 130 as shown in FIG. 7D. Simultaneous engagement of the clutches 122, 124 splits the recirculated power 196 between the third and fourth inner power paths 153, 154 so that the variator 116 is effectively bypassed, thereby reducing the load experienced by the variator 116. The split recirculated power 197 flowing along the third inner power path 153 to the second gearset 130 is combined with the split recirculated power 197 flowing along the fourth inner power path 154 to the second gearset 130 at the second gearset 130. Therefore, the split recirculated power 197 becomes the recirculated power 196 that is transmitted from the second gearset 130 to the junction 156 as shown in FIG. 7D.

The recirculated power 196 transmitted to the junction 156 is combined with the input power 195 received at the input shaft 112 from the drive unit 102 as suggested in FIG. 7D. As a result, the recirculated power 196 transmitted from the junction 156 to the first gearset 128 is greater than the input power 195 initially transmitted to the junction 156 from the drive unit 102. From the first gearset 128, a portion of the recirculated power 196 may be transmitted to the output shaft 114 and a portion of the recirculated power 196 may be recirculated back to the junction 157.

Figure 8A:
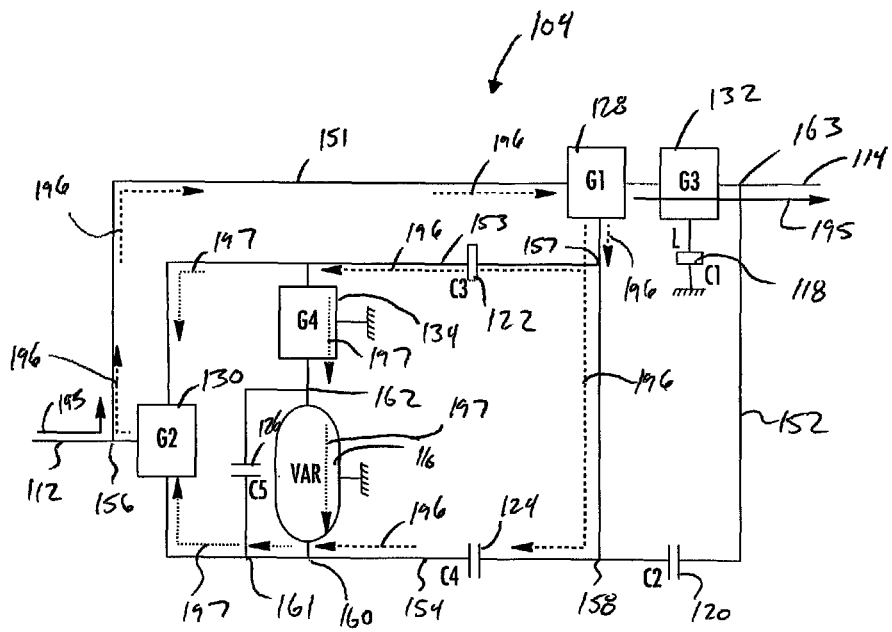
FIG. 8A is a block diagrammatic view of the infinitely variable transmission of FIG. 1 showing power flow therethrough in a second forward operating mode.

Referring now to FIG. 8A, power flow from the input shaft 112 to the output shaft 114 of the transmission 104 in the "Mode 2" operating mode is shown. As indicated above, the first clutch 118 and the third clutch 122 are each engaged in the "Mode 2" operating mode. Input power 195 initially flows from the input shaft 112 to the junction 156 and thereafter to the first gearset 128 along the first outer power path 151. Input power 195 flows from the first gearset 128 to the third gearset 132 and thereafter to the output shaft 114 along the first outer power path 151 as shown in FIG. 8A.

The first gearset 128 recirculates a portion of the input power 195 away from the output shaft 114 and toward the input shaft 112 as indicated above and as shown in FIG. 8A. Recirculated power 196 flows from the first gearset 128 to the junction 157 along the first outer power path 151 as shown in FIG. 8A.

The recirculated power 196 is transmitted from the junction 157 to the junction 159 where the recirculated power 196 is split as shown in FIG. 8A. The recirculated power 196 is split at the junction 159 so that split recirculated power 197 flows to the second gearset 130 and split recirculated power 197 flows from the junction 159 to the junction 160 (i.e. through the fourth gearset 134 and the variator 116) and thereafter to the second gearset 130 along the third inner power path 153 as shown in FIG. 8A. The split recirculated power 197 flowing to the second gearset 130 from the junction 159 is combined with the split recirculated power 197 flowing to the second gearset 130 from the junction 160 at the second gearset 130. Therefore, the split recirculated power 197 becomes the recirculated power 196 that is transmitted from the second gearset 130 to the junction 156 as shown in FIG. 8A.

The recirculated power 196 transmitted to the junction 156 is combined with the input power 195 received at the input shaft 112 from the drive unit 102 as suggested in FIG. 8A. As a result, the recirculated power 196 transmitted from the junction 156 to the first gearset 128 is greater than the input power 195 initially transmitted to the junction 156 from the drive unit 102. From the first gearset 128, a portion of the recirculated power 196 may be transmitted to the output shaft 114 and a portion of the recirculated power 196 may be recirculated back to the junction 157.

Figure 8B:
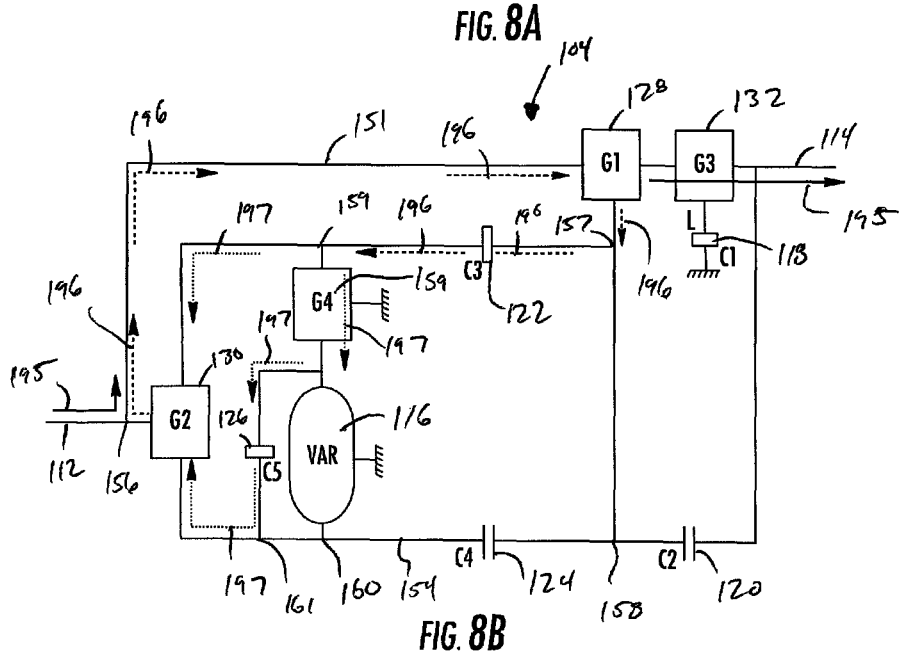
FIG. 8B is a block diagrammatic view of the infinitely variable transmission of FIG. 1 showing power flow therethrough in a second variator bypass operating mode.

Referring now to FIG. 8B, power flow from the input shaft 112 to the output shaft 114 of the transmission 104 in the "Bypass 2" operating mode is shown. As indicated above, the first clutch 118, the third clutch 122, and the variator bypass clutch 126 are each engaged in the "Bypass 2" operating mode. Input power 195 initially flows from the input shaft 112 to the junction 156 and thereafter to the first gearset 128 along the first outer power path 151. Input power 195 flows from the first gearset 128 to the third gearset 132 and thereafter to the output shaft 114 along the first outer power path 151 as shown in FIG. 8B.

The first gearset 128 recirculates a portion of the input power 195 away from the output shaft 114 and toward the input shaft 112 as indicated above and as shown in FIG. 8B. Recirculated power 196 flows from the first gearset 128 to the junction 157 as shown in FIG. 8B.

The recirculated power 196 is transmitted from the junction 157 to the junction 159 where the recirculated power 196 is split as shown in FIG. 8B. The recirculated power 196 is split at the junction 159 so that split recirculated power 197 flows to the second gearset 130 and split recirculated power 197 flows from the junction 159 to the junction 161 (i.e. through the fourth gearset 134 and the variator bypass clutch 126) and thereafter to the second gearset 130 along the third inner power path 153 as shown in FIG. 8B. The split recirculated power 197 flowing to the second gearset 130 from the junction 159 is combined with the split recirculated power 197 flowing to the second gearset 130 from the junction 160 at the second gearset 130. Therefore, the split recirculated power 197 becomes the recirculated power 196 that is transmitted from the second gearset 130 to the junction 156 as shown in FIG. 8B.

The recirculated power 196 transmitted to the junction 156 is combined with the input power 195 received at the input shaft 112 from the drive unit 102 as suggested in FIG. 8B. As a result, the recirculated power 196 transmitted from the junction 156 to the first gearset 128 is greater than the input power 195 initially transmitted to the junction 156 from the drive unit 102. From the first gearset 128, a portion of the recirculated power 196 may be transmitted to the output shaft 114 and a portion of the recirculated power 196 may be recirculated back to the junction 157.

Figure 9A:
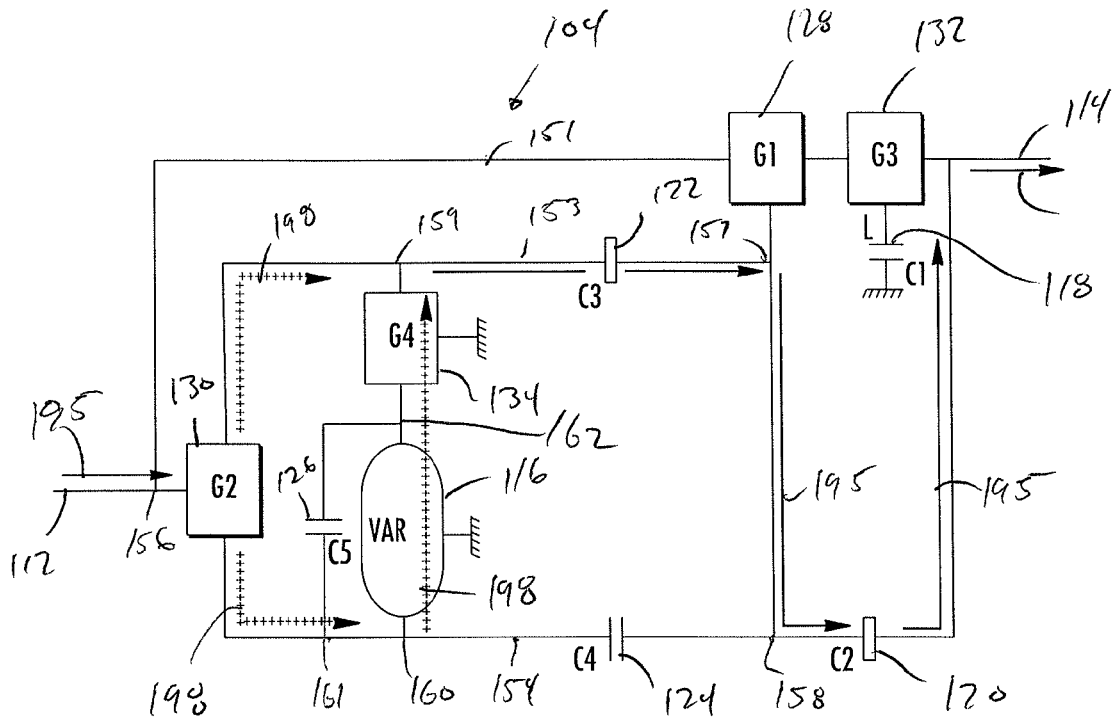
FIG. 9A is a block diagrammatic view of the infinitely variable transmission of FIG. 1 showing power flow therethrough in a third forward operating mode.
Figure 10A:
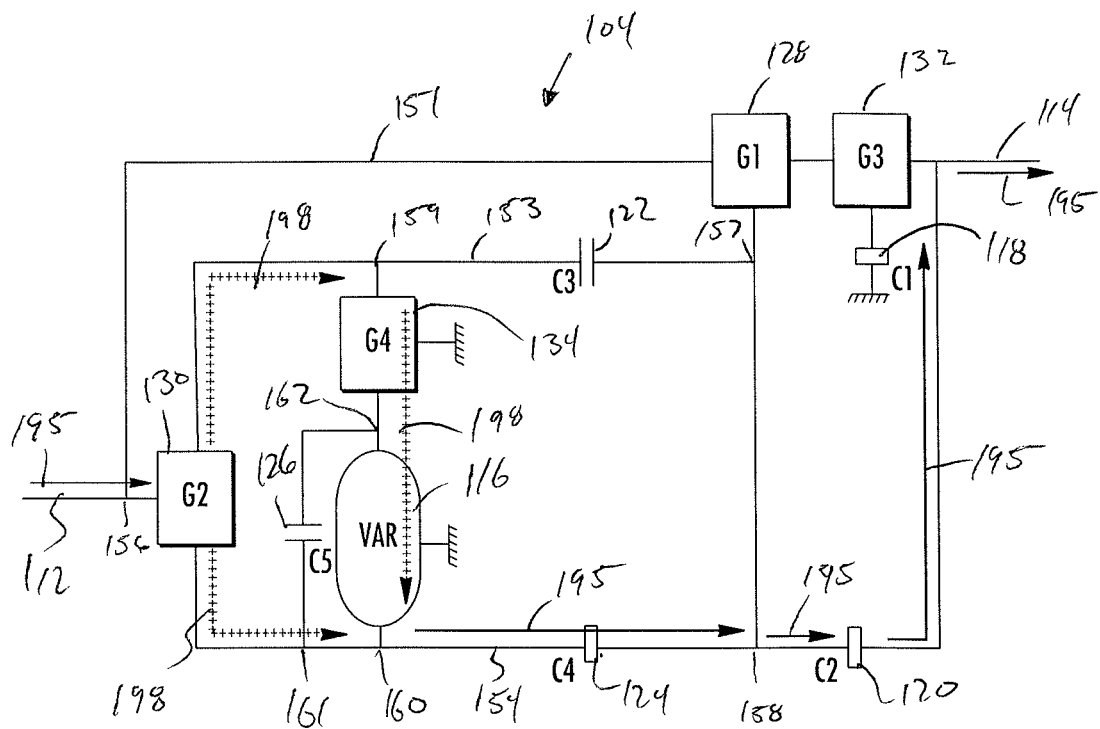
FIG. 10A is a block diagrammatic view of the infinitely variable transmission of FIG. 1 showing power flow therethrough in a fourth forward operating mode.

In each of FIGS. 7A-7B and FIGS. 8A-8B, recirculated power 196 transmitted to the variator 116 is split so that the variator 116 experiences only a fraction of the entire recirculated power 196. In FIGS. 9A, and 10A, as discussed below, input power 195 transmitted to the variator 116 is split so that the variator 116 experiences only a fraction of the entire input power. As a result, the variator 116 may experience a substantial power reduction over the course of operating the transmission 104 in each of those operating modes. For example, an average power reduction of 50% through the variator 116 may be achieved over the course of operating the transmission 104 in each of those operating modes.

Figure 8C:
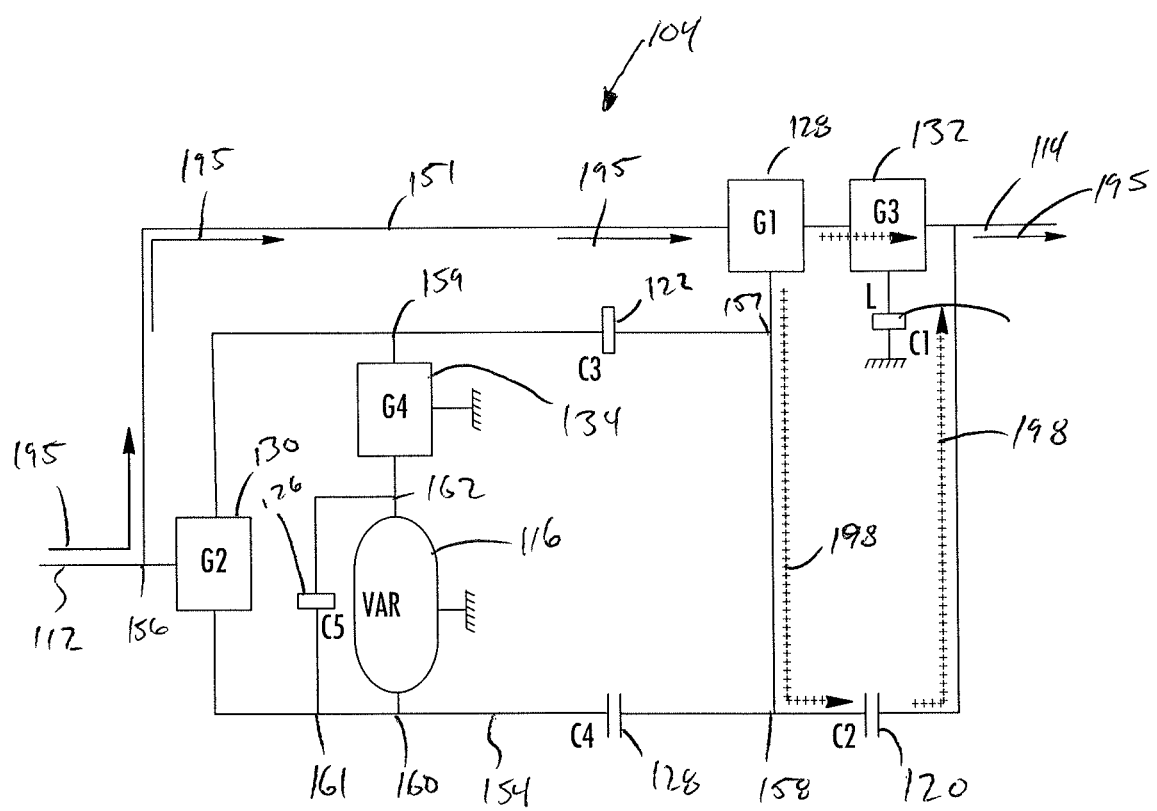
FIG. 8C is a block diagrammatic view of the infinitely variable transmission of FIG. 1 showing power flow therethrough in a second synchronous operating mode.

Referring now to FIG. 8C, power flow from the input shaft 112 to the output shaft 114 of the transmission 104 in the "Sync 2-3" operating mode is shown. As indicated above, the first clutch 118, the second clutch 120, and the third clutch 122 are each engaged in the "Sync 2-3" operating mode. As discussed below, the simultaneous power flow from the first gearset 128 to the third gearset 132 and thereafter to the output shaft 112 along the first outer power path 151 and from the junction 158 to the third gearset 132 and thereafter to the junction 163 along the second outer power path 152 effectively bypasses the variator 116 to reduce the load experienced by the variator 116 in the "Sync 2-3" operating mode.

Input power 195 initially flows from the input shaft 112 to the junction 156 and thereafter to the first gearset 128 along the first outer power path 151 as shown in FIG. 8C. The input power 195 is split by the first gearset 128 so that split input power 198 (designated by the plus-sign arrows) flows from the first gearset 128 to the third gearset 132 and thereafter to the junction 163 and from the first gearset 128 to the junction 158 and thereafter to the junction 163 as shown in FIG. 8C.

The split input power 198 flowing to the junction 163 along the first outer power path 151 is combined with the split input power 198 flowing from the junction 158 to the junction 163 along the second outer power path 152 at the junction 163 as shown in FIG. 8C. Therefore, the split input power 198 becomes the input power 195 at the junction 163 that is transmitted to the output shaft 114 as shown in FIG. 8C.

Referring now to FIG. 9A, power flow from the input shaft 112 to the output shaft 114 of the transmission 104 in the "Mode 3" operating mode is shown. As indicated above, the second clutch 120 and the third clutch 122 are engaged in the "Mode 3" operating mode. Input power 195 initially flows from the input shaft 112 to the junction 156 and thereafter to the second gearset 130. Input power 195 is split at the second gearset 130 so that split input power 198 flows from the second gearset 130 to the junction 159 along the third inner power path 153 and from the second gearset to the junction 160 along the fourth inner power path 154.

The split input power 198 flowing to the junction 159 along the third inner power path 153 is combined with the split input power 198 flowing from the junction 160 to the junction 159 (i.e. through the variator 116 and the fourth gearset 134) at the junction 159 as shown in FIG. 9A. The split input power 198, therefore, becomes the input power 195 at the junction 159. The input power 195 flows along the third inner power path 153 to the junction 157 and from the junction 157 to the junction 158 as shown in FIG. 9A. The input power 195 flows from the junction 158 along the second outer power path 152 to the junction 163 where the input power 195 is transmitted to the output shaft 114.

Figure 9B:
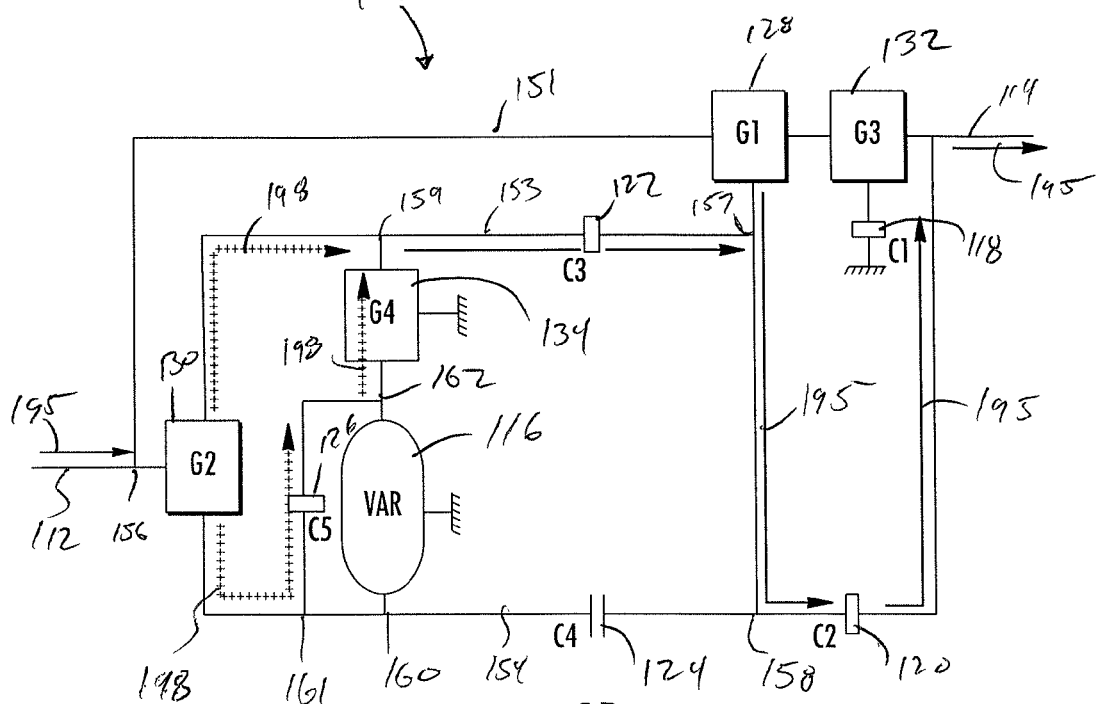
FIG. 9B is a block diagrammatic view of the infinitely variable transmission of FIG. 1 showing power flow therethrough in a third variator bypass operating mode.

Referring now to FIG. 9B, power flow from the input shaft 112 to the output shaft 114 of the transmission 104 in the "Bypass 3" operating mode is shown. As indicated above, the second clutch 120, the third clutch 122 and the variator bypass clutch 126 are engaged in the "Bypass 3" operating mode. Input power 195 initially flows from the input shaft 112 to the junction 156 and thereafter to the second gearset 130. Input power 195 is split at the second gearset 130 so that split input power 198 flows from the second gearset 130 to the junction 159 along the third inner power path 153 and from the second gearset 130 to the junction 161 along the fourth inner power path 154.

The split input power 198 flowing to the junction 159 along the third inner power path 153 is combined with the split input power 198 flowing from the junction 161 to the junction 159 (i.e. through the variator bypass clutch 126 and the fourth gearset 134) at the junction 159 as shown in FIG. 9A. The split input power 198, therefore, becomes the input power 195 at the junction 159. The input power 195 flows along the third inner power path 153 to the junction 157 and from the junction 157 to the junction 158 as shown in FIG. 9A. The input power 195 flows from the junction 158 along the second outer power path 152 to the junction 163 where the input power 195 is transmitted to the output shaft 114.

Figure 9C:
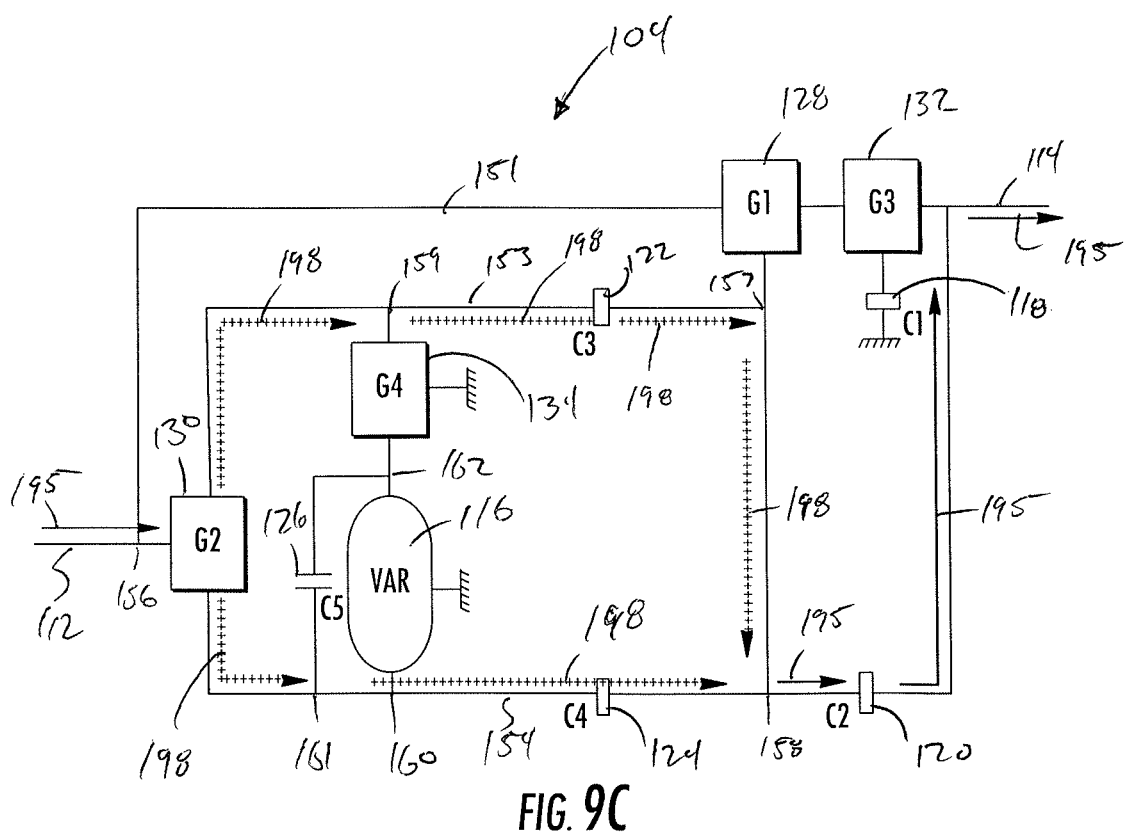
FIG. 9C is a block diagrammatic view of the infinitely variable transmission of FIG. 1 showing power flow therethrough in a third synchronous operating mode.

Referring now to FIG. 9C, power flow from the input shaft 112 to the output shaft 114 of the transmission 104 in the "Sync 3-4" operating mode is shown. As indicated above, the second clutch 120, the third clutch 122, and the fourth clutch 124 are engaged in the "Sync 3-4" operating mode. Input power 195 initially flows from the input shaft 112 to the junction 156 and thereafter to the second gearset 130. Input power 195 is split at the second gearset 130 so that split input power 198 flows from the second gearset 130 to the junction 157 along the third inner power path 153 and from the second gearset 130 to the junction 158 along the fourth inner power path 154. The simultaneous split power flow 198 along the third inner power path 153 to the junction 157 and along the fourth inner power path 154 to the junction 158 effectively bypasses the variator 116 and thereby reduces the load experienced by the variator 116 in the "Sync 3-4" operating mode.

The split input power 198 flowing to the junction 157 along the third inner power path 153 flows to the junction 158 and is combined with the split input power 198 flowing to the junction 158 along the fourth inner power path 154 at the junction 158 as shown in FIG. 9C. The split input power 198, therefore, becomes the input power 195 at the junction 158. The input power 195 flows from the junction 158 along the second outer power path 152 to the junction 163 where the input power 195 is transmitted to the output shaft 114 as shown in FIG. 9C.

Referring now to FIG. 10A, power flow from the input shaft 112 to the output shaft 114 of the transmission 104 in the "Mode 4" operating mode is shown. As indicated above, the second clutch 120 and the fourth clutch 124 are engaged in the "Mode 4" operating mode. Input power 195 initially flows from the input shaft 112 to the junction 156 and thereafter to the second gearset 130. Input power 195 is split at the second gearset 130 so that split input power 198 flows from the second gearset 130 to the junction 159 and from the second gearset 130 to the junction 160 along the fourth inner power path 154.

The split input power 198 flowing to the junction 160 along the fourth inner power path 154 is combined with the split input power 198 flowing from the junction 159 to the junction 160 (i.e. through the variator 116 and the fourth gearset 134) at the junction 160 as shown in FIG. 10A. The split input power 198, therefore, becomes the input power 195 at the junction 160. The input power 195 flows from the junction 160 along the fourth inner power path 154 to the junction 158 as shown in FIG. 10A. The input power 195 flows from the junction 158 along the second outer power path 152 to the junction 163 where the input power 195 is transmitted to the output shaft 114 as shown in FIG. 10A.

Figure 10B:
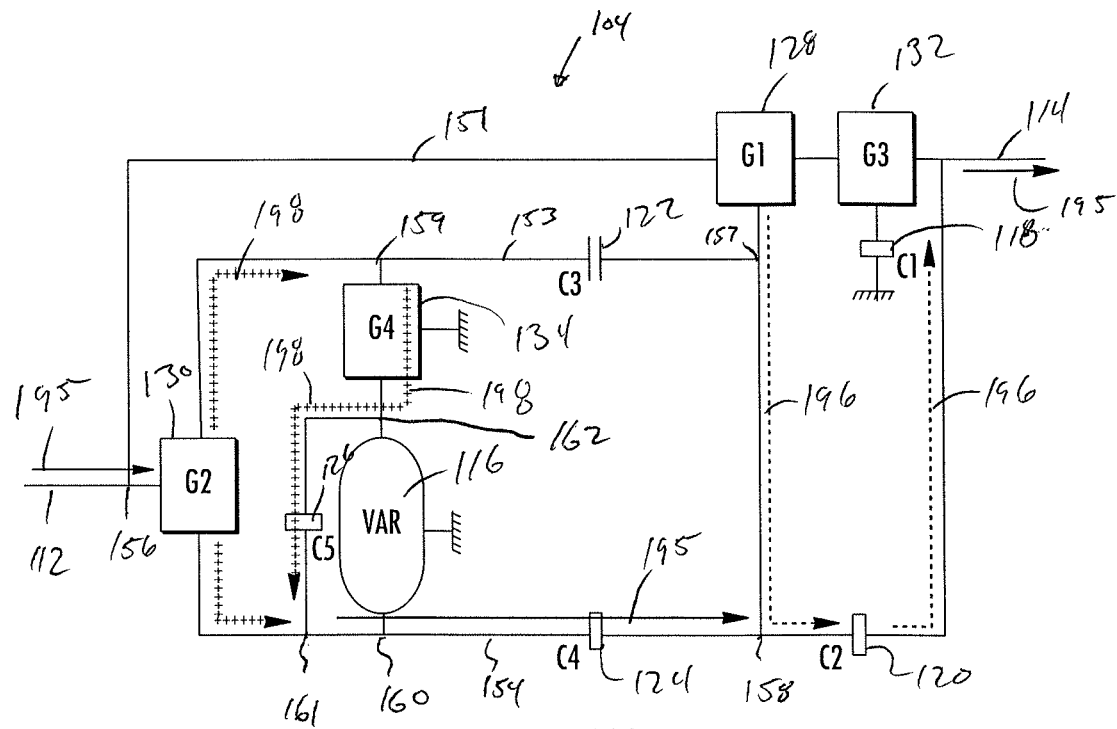
FIG. 10B is a block diagrammatic view of the infinitely variable transmission of FIG. 1 showing power flow therethrough in a fourth variator bypass operating mode.

Referring now to FIG. 10B, power flow from the input shaft 112 to the output shaft 114 of the transmission 104 in the "Bypass 4" operating mode is shown. As indicated above, the second clutch 120, the fourth clutch 124, and the variator bypass clutch 126 are engaged in the "Bypass 4" operating mode. Input power 195 initially flows from the input shaft 112 to the junction 156 and thereafter to the second gearset 130. Input power 195 is split at the second gearset 130 so that split input power 198 flows from the second gearset 130 to the junction 159 and from the second gearset 130 to the junction 161 along the fourth inner power path 154.

The split input power 198 flowing to the junction 161 along the fourth inner power path 154 is combined with the split input power 198 flowing from the junction 159 to the junction 161 (i.e. through the variator bypass clutch 126 and the fourth gearset 134) at the junction 161 as shown in FIG. 10B. The split input power 198, therefore, becomes the input power 195 at the junction 161. The input power 195 flows from the junction 161 along the fourth inner power path 154 to the junction 158 as shown in FIG. 10B. The input power 195 flows from the junction 158 along the second outer power path 152 to the junction 163 where the input power 195 is transmitted to the output shaft 114 as shown in FIG. 10B.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

The invention claimed is:
1. A transmission operable in a plurality of operating modes, the transmission comprising:
   an input shaft configured to receive torque from a drive unit and transmit the torque to an output shaft of the transmission, a plurality of gearsets arranged between the input shaft and the output shaft and including a first planetary gearset coupled to the input shaft and a second planetary gearset coupled to the input shaft, a variable-ratio unit coupled to the second planetary gearset and configured to receive a power load, and a plurality of torque transmitting mechanisms including a first clutch and a variator bypass clutch, the first clutch engageable to couple the first planetary gearset to the second planetary gearset to define a first power path therebetween, and the variator bypass clutch engageable to bypass the variable-ratio unit so that power transmitted along the first power path is transmitted to the variator bypass clutch rather than the variable-ratio unit, wherein the power load received by the variable-ratio unit is reduced in at least one operating mode when (i) the first clutch is engaged and (ii) the variator bypass clutch is engaged.

2. The transmission of claim 1, wherein the second planetary gearset includes at least one idler-planet gear.

3. The transmission of claim 1, wherein the transmission achieves a transmission ratio varying within a defined range when the variator bypass clutch is not engaged.

4. The transmission of claim 3, wherein the transmission achieves a fixed transmission ratio when the variator bypass clutch is engaged.

5. The transmission of claim 1, further comprising a third planetary gearset arranged between the input shaft and the output shaft and coupled to the first planetary gearset.

6. The transmission of claim 5, further comprising a fourth planetary gearset arranged between the input shaft and the output shaft and coupled to the second planetary gearset.

7. The transmission of claim 6, wherein the fourth planetary gearset includes at least one idler-planet gear.

8. The transmission of claim 7, wherein the transmission achieves a transmission ratio varying within a defined range when the variator bypass clutch is not engaged.

9. The transmission of claim 8, wherein the transmission achieves a fixed transmission ratio when the variator bypass clutch is engaged to bypass the variable-ratio unit.

10. The transmission of claim 9, wherein the second planetary gearset includes at least one idler-planet gear.

11. A transmission operable in a plurality of operating modes, the transmission comprising:

an input shaft configured to receive torque from a drive unit and transmit the torque to an output shaft of the transmission, a plurality of gearsets arranged between the input shaft and the output shaft and including a first planetary gearset coupled to the input shaft and a second planetary gearset coupled to the input shaft, a variable-ratio unit coupled to the second planetary gearset and configured to receive a power load, and a plurality of torque transmitting mechanisms including a first clutch and a second clutch, the first clutch engageable to couple the first planetary gearset to the second planetary gearset to define a first power path therebetween and the second clutch engageable to couple the first planetary gearset to the second planetary gearset to define a second power path therebetween, wherein the power load received by the variable-ratio unit is reduced in at least one operating mode when (i) the first clutch is engaged and (ii) the second clutch is engaged.

12. The transmission of claim 11, further comprising a third planetary gearset arranged between the input shaft and the output shaft and coupled to the first planetary gearset.

13. The transmission of claim 12, further comprising a fourth planetary gearset arranged between the input shaft and the output shaft and coupled to the second planetary gearset.

14. The transmission of claim 13, wherein the transmission achieves a fixed transmission ratio when the first clutch is engaged and the second clutch is engaged in a first operating mode.

15. The transmission of claim 14, wherein the first operating mode enables a synchronous shift from a first forward range to a second forward range.

16. The transmission of claim 15, wherein the first planetary gearset is configured to recirculate torque transmitted to the first planetary gearset from the input shaft to the second planetary gearset when the first clutch is engaged.

17. The transmission of claim 16, wherein the first planetary gearset is configured to recirculate torque transmitted to the first planetary gearset from the input shaft to the second planetary gearset when the second clutch is engaged.

18. The transmission of claim 16, wherein a first junction splits the torque recirculated from the first planetary gearset to the second planetary gearset along the first power path to reduce the load received by the variable-ratio unit.

19. The transmission of claim 17, wherein a second junction splits the torque recirculated from the first planetary gearset to the second planetary gearset along the second power path to reduce the load received by the variable-ratio unit.

20. A transmission comprising:

an input shaft configured to receive torque from a drive unit and transmit the torque to an output shaft of the transmission, a variable-ratio unit configured to receive a power load, and a plurality of torque-transmitting mechanisms engageable to define a plurality of power paths between the input shaft and the output shaft, including a first clutch, a second clutch, and a third clutch engageable in combination with one another to transmit power along a first power path, a second power path, and a third power path, wherein a first gearset included in the transmission is configured to (i) transmit power from the input shaft to the output shaft along the first power path when the first clutch is engaged, (ii) recirculate power from the input shaft back to the input shaft along the second power path when the second clutch is engaged, and (iii) recirculate power from the input shaft back to the input shaft along the third power path when the third clutch is engaged.

* * * * *